US012694667B2

(12) United States Patent
Tsai et al.

(10) Patent No.: US 12,694,667 B2
(45) Date of Patent: Jul. 28, 2026

(54) SYSTEMS AND METHODS FOR SEGMENTATION MAP ERROR CORRECTION

(71) Applicant: QUALCOMM Incorporated, San Diego, CA (US)

(72) Inventors: Chung-Chi Tsai, San Diego, CA (US); Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/505,010

(22) Filed: Nov. 8, 2023

(65) Prior Publication Data

US 2025/0148777 A1 May 8, 2025

(51) Int. Cl.
*G06V 10/98* (2022.01)
*G06T 3/40* (2024.01)
*G06T 7/12* (2017.01)
*G06V 10/764* (2022.01)
*G06V 10/774* (2022.01)

(52) U.S. Cl.
CPC ................ *G06V 10/98* (2022.01); *G06T 3/40* (2013.01); *G06T 7/12* (2017.01); *G06V 10/764* (2022.01); *G06V 10/774* (2022.01); *G06T 2207/10016* (2013.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 10,410,352 B1 * | 9/2019 | Kim | ......................... | G06N 3/09 |
| 2020/0143934 A1 * | 5/2020 | Gering | ...................... | G06T 7/12 |
| 2020/0327334 A1 | 10/2020 | Goren et al. | | |
| 2021/0158511 A1 * | 5/2021 | Guo | ....................... | G16H 50/30 |
| 2021/0279887 A1 * | 9/2021 | Ma | ........................... | G06T 7/12 |
| 2021/0290096 A1 * | 9/2021 | Yang | ...................... | A61B 6/032 |
| 2022/0060619 A1 * | 2/2022 | Pinhasov | ............... | H04N 23/66 |
| 2022/0222791 A1 * | 7/2022 | Zhang | ....................... | G06T 5/40 |
| 2023/0326035 A1 * | 10/2023 | Li | ............................. | G06T 7/12 |
| | | | | 382/173 |

(Continued)

OTHER PUBLICATIONS

Wang et al. "Standing on the Shoulders of Giants: Improving Medical Image Segmentation via Bias Correction", Med Image Comput Comput Assist Interv. 2010 ; 13(Pt 3): 105-112. (Year: 2010).*

(Continued)

*Primary Examiner* — Randolph I Chu
(74) *Attorney, Agent, or Firm* — Polsinelli LLP/QUALCOMM Incorporated

(57) ABSTRACT

Imaging systems and techniques are described. In some examples, an imaging system generates a segmentation map of an image by processing image data associated with the image using a segmentation mapper. Different object types in the image are categorized into different regions in the segmentation map. The imaging system generates an augmented segmentation map by processing at least the segmentation map using a segmentation map error correction engine. The imaging system generates processed image data by processing the image using the augmented segmentation map.

30 Claims, 16 Drawing Sheets

(56) References Cited

U.S. PATENT DOCUMENTS

| | | | |
|---|---|---|---|
| 2023/0410316 A1* | 12/2023 | Macaulay | G06V 10/26 |
| 2024/0005512 A1* | 1/2024 | Kanakatte Gurumurthy | |
| | | | G06T 7/12 |
| 2024/0354963 A1* | 10/2024 | Yang | H04N 7/157 |

OTHER PUBLICATIONS

Liu et al. "Weakly Supervised Instance Segmentation for Videos with Temporal Mask Consistency", CVPR 2021 (Year: 2021).*
International Search Report and Written Opinion—PCT/US2024/047230—ISA/EPO—Dec. 4, 2024.

* cited by examiner

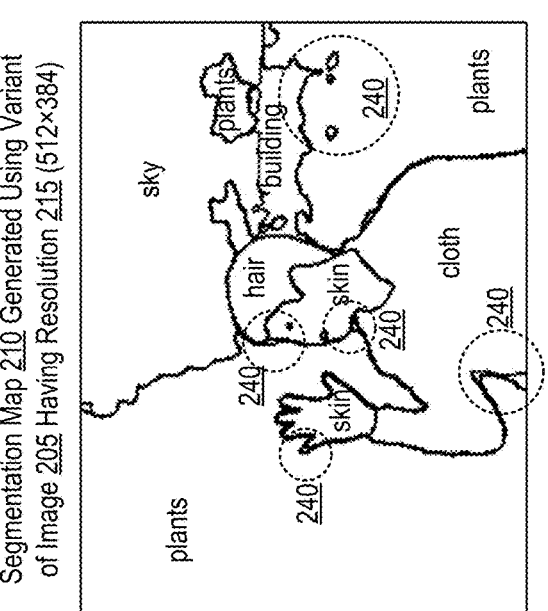
Segmentation Map 210 Generated Using Variant of Image 205 Having Resolution 215 (512×384)
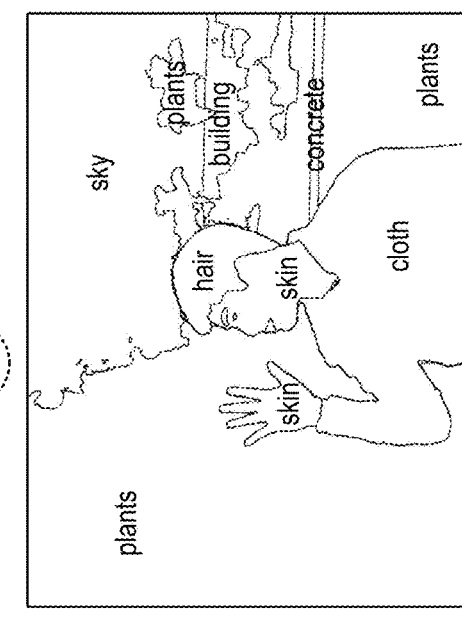
Segmentation Map 230 Generated Using Variant of Image 205 Having Resolution 235 (2048×1536)
Image 205
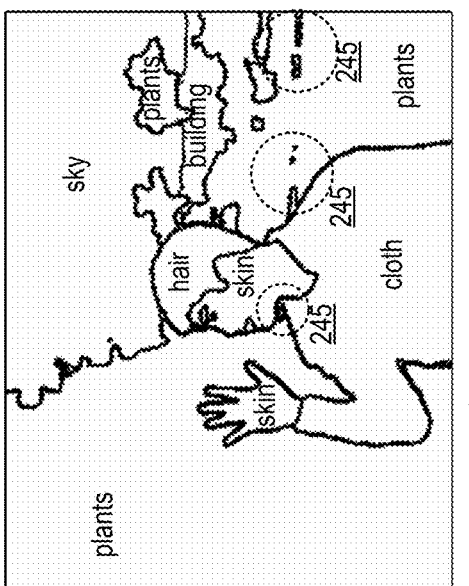
Segmentation Map 220 Generated Using Variant of Image 205 Having Resolution 225 (1024×768)
FIG. 2

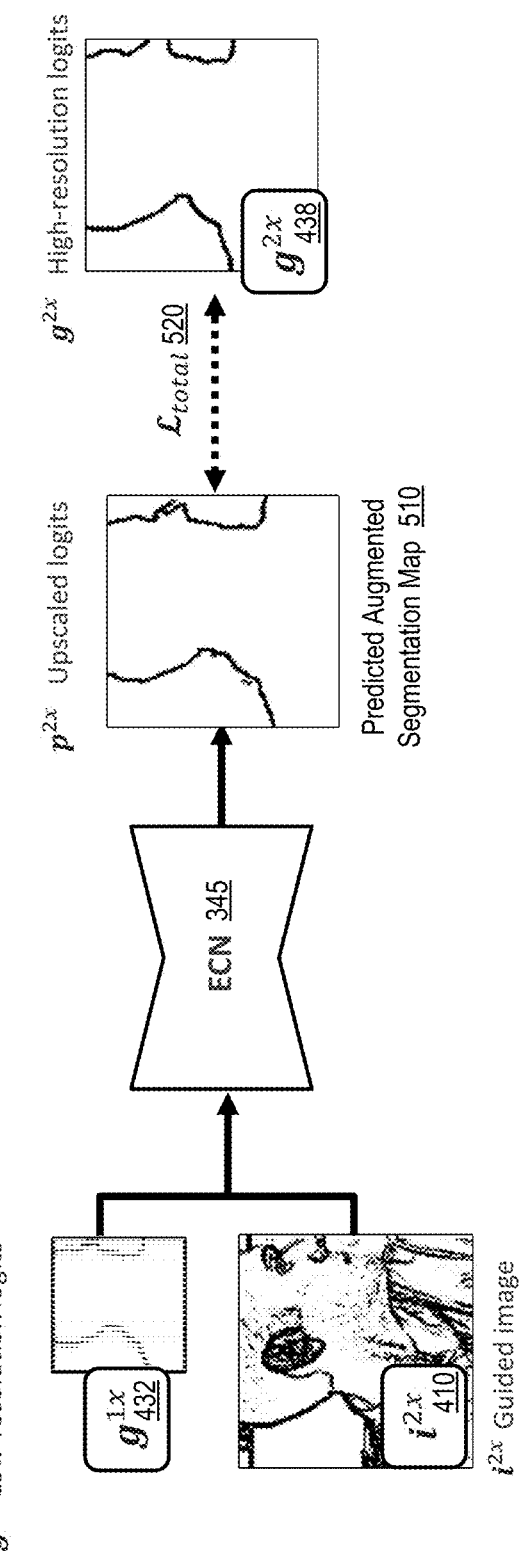
FIG. 5

1300

3rd Camera 1330C

4th Camera 1330D

Display(s) 1340

Earpiece 1335

1st Camera 1330A

HMD 1310

2nd Camera 1330B

1350

2nd Camera 1330B

1st Camera 1330A

HMD 1310

User 1320

Earpiece 1335

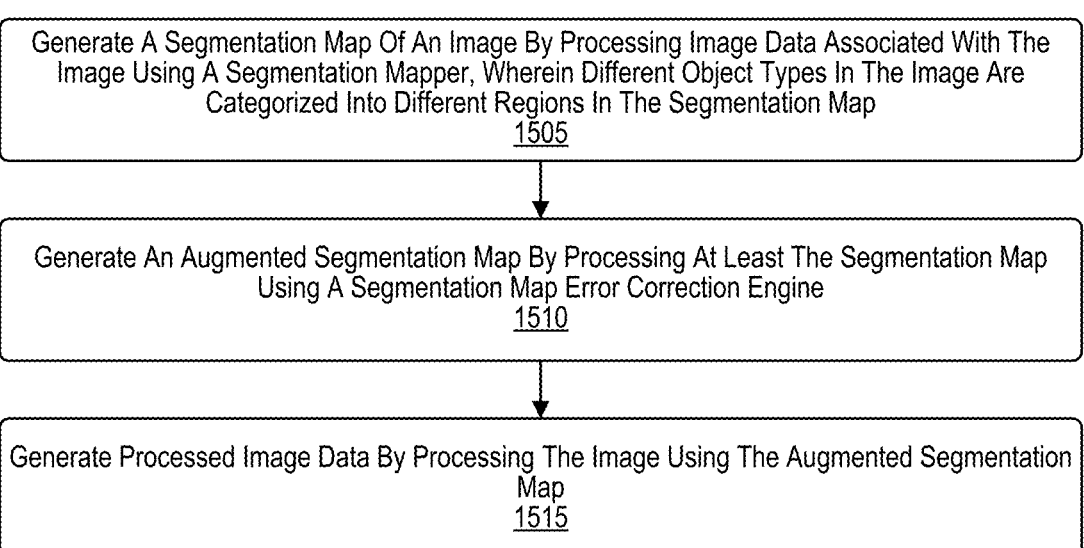

1500

Generate A Segmentation Map Of An Image By Processing Image Data Associated With The Image Using A Segmentation Mapper, Wherein Different Object Types In The Image Are Categorized Into Different Regions In The Segmentation Map
1505

Generate An Augmented Segmentation Map By Processing At Least The Segmentation Map Using A Segmentation Map Error Correction Engine
1510

Generate Processed Image Data By Processing The Image Using The Augmented Segmentation Map
1515

FIG. 15

SYSTEMS AND METHODS FOR SEGMENTATION MAP ERROR CORRECTION

FIELD

This application is related to image processing. More specifically, this application relates to systems and methods of generating and enhancing segmentation maps from image data for use in processing the image data.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Some devices can analyze image data captured by an image sensor to detect an object within the image data. Sometimes, cameras can be used to capture images of scenes that include one or more people.

BRIEF SUMMARY

Systems and techniques for error correction and/or imaging are described. In some examples, an imaging system generates a segmentation map of an image by processing image data associated with the image using a segmentation mapper. Different object types in the image are categorized into different regions in the segmentation map. The imaging system generates an augmented segmentation map by processing at least the segmentation map using a segmentation map error correction engine. In some examples, the augmented segmentation map is more accurate than the segmentation map, for instance having edges that more accurately align to edges in the image than the segmentation map. The imaging system generates processed image data by processing the image using the augmented segmentation map.

In another example, an apparatus for imaging is provided that includes at least one memory and at least one processor coupled to the at least one memory. The at least one processor is configured to: generate a segmentation map of an image by processing image data associated with the image using a segmentation mapper, wherein different object types in the image are categorized into different regions in the segmentation map; generate an augmented segmentation map by processing at least the segmentation map using a segmentation map error correction engine; and generate processed image data by processing the image using the augmented segmentation map According to at least one example, a method is provided for error correction. The method includes: generating a segmentation map of an image by processing image data associated with the image using a segmentation mapper, wherein different object types in the image are categorized into different regions in the segmentation map; generating an augmented segmentation map by processing at least the segmentation map using a segmentation map error correction engine; and generating processed image data by processing the image using the augmented segmentation map.

In another example, a non-transitory computer-readable medium is provided that has stored thereon instructions that, when executed by one or more processors, cause the one or more processors to: generate a segmentation map of an image by processing image data associated with the image using a segmentation mapper, wherein different object types in the image are categorized into different regions in the segmentation map; generate an augmented segmentation map by processing at least the segmentation map using a segmentation map error correction engine; and generate processed image data by processing the image using the augmented segmentation map In another example, an apparatus for imaging is provided. The apparatus includes: means for generating a segmentation map of an image by processing image data associated with the image using a segmentation mapper, wherein different object types in the image are categorized into different regions in the segmentation map; means for generating an augmented segmentation map by processing at least the segmentation map using a segmentation map error correction engine; and means for generating processed image data by processing the image using the augmented segmentation map.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 2 is a conceptual diagram illustrating an image and examples of segmentation maps generated using variants of the image having different resolutions, in accordance with some examples;

FIG. 5 is a block diagram illustrating a process for training the error correction network of FIG. 3 using the training data of FIG. 4, in accordance with some examples;

FIG. 15 is a flow diagram illustrating a process for imaging, in accordance with some examples.

DETAILED DESCRIPTION

Figure 1:
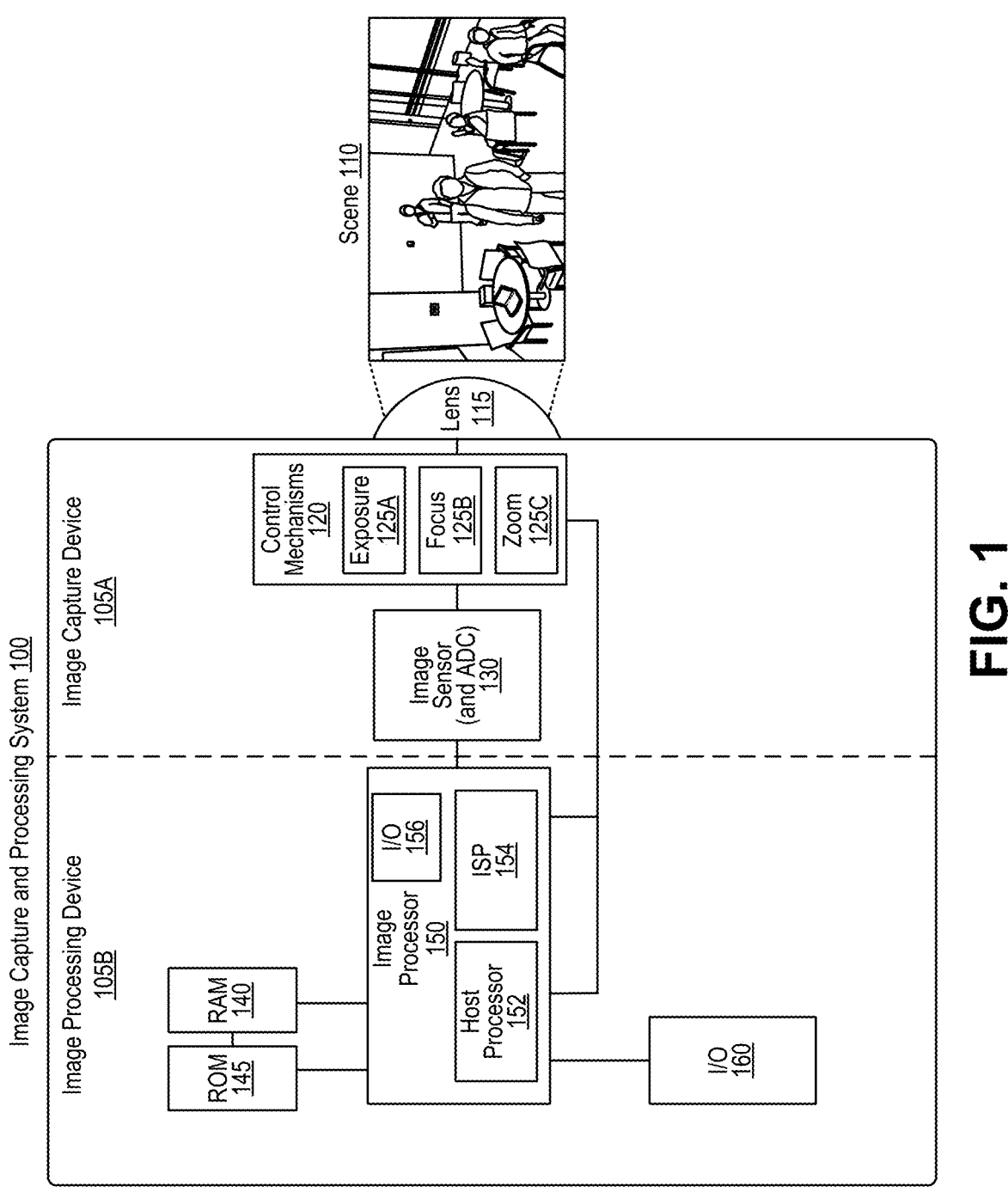
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A device that includes a camera can analyze image data captured by an image sensor to detect, recognize, classify, and/or track an object within the image data. For instance, by detecting and/or recognizing an object in multiple video frames of a video, the device can track movement of the object over time.

In neural network (NN) architectures and other machine learning (ML) architectures, data samples are passed to a ML model for processing, generally with various parameters (e.g., noise level, denoising amount) added as additional inputs to the ML model. During training an NN, the parameters can be concatenated to the data samples at portion(s) of the NN (e.g., the beginning of the NN) to process the data samples according to the parameters. The parameters allow the NN to differentiate across the various data samples the NN is learning from. The learning and/or processing processes for the NN involve extra computation as the additional parameters provide extra channels or dimensions of data that go through all of the NN's calculations. In some cases, however, one or more of the parameters (e.g., noise level, denoising amount) are consistent, constant, and/or static across data in the data sample (e.g., across the pixels of an image). In some examples, systems and techniques are described for adjusting the NN (or another ML model) based on the parameters, for instance so that bias offsets in one or more layers of the NN are set based on values of the parameters and/or so that weights corresponding to the parameters are removed from one or more layers of the NN. The result is an adjusted NN that can process the data sample according to the parameters using only the data sample as an input, without receiving the parameters as an input. Using the adjusted NN in place of the NN and the reduced input (that includes the data sample without the parameters) reduces the number of channels and/or dimensions of data that are input to and processed by the (adjusted) NN, can therefore reduce processing time for processing the data sample according to the parameters, can therefore reduce computational resources used in processing the data sample according to the parameters, and can therefore improve speed and efficiency in processing the data sample according to the parameters.

Imaging systems and techniques are described. Systems and techniques for error correction and/or imaging are described. In some examples, an imaging system generates a segmentation map of an image by processing image data associated with the image using a segmentation mapper. Different object types in the image are categorized into different regions in the segmentation map. The imaging system generates an augmented segmentation map by processing at least the segmentation map using a segmentation map error correction engine. In some examples, the augmented segmentation map is more accurate than the segmentation map, for instance having edges that more accurately align to edges in the image than the segmentation map. The imaging system generates processed image data by processing the image using the augmented segmentation map.

The imaging and/or error correction systems and techniques described herein provide a number of technical improvements over prior imaging systems, for instance generating more accurate segmentation maps for images more efficiently than other systems. For instance, the imaging systems and techniques described herein can retain the efficiency increase from generating a segmentation map using a downscaled variant of the image, while efficiently increasing accuracy of such a segmentation map using an efficient error correction network. The resulting augmented segmentation map is generally comparable in accuracy to a segmentation map generated from the full-resolution image (or a high-resolution variant of the image), but is generated more quickly and efficiently (in terms of use of computational resources) than such a segmentation map.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1610 discussed with respect to the computing system 1600. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1620, read-only memory (ROM) 145 and/or 1625, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1635, any other input devices 1645, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the system 100 and one or more peripheral devices, over which the system 100 may receive data from the one or more peripheral device and/or transmit data to the one or more peripheral devices. The I/O devices 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1602.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

FIG. 2 is a conceptual diagram illustrating an image 205 and examples of segmentation maps generated using variants of the image having different resolutions. The image 205 may have a resolution of 2048×1536 or higher. The image 205 depicts a man standing with one hand raised. Behind the man, plans, a building, a concrete sidewalk, and the sky are visible.

In an illustrative example, the image 205 may have a resolution of 4032×3024. The image 205 (or a variant thereof) can be input into a trained machine learning (ML) model used for segmentation mapping, such as the segmentation network 335 of FIG. 3, to generate a segmentation map.

For instance, the image 205 is downscaled (e.g., using a downscaler such as the downscaler 330 of FIG. 3) to a low resolution 215 of 512×384 to generate a downscaled variant of the image 205 having the low resolution 215 of 512×384. This downscaled variant of the image 205 (having the low resolution 215 of 512×384) is input into the segmentation network to generate the segmentation map 210 illustrated in FIG. 2.

The segmentation maps illustrated in FIG. 2 (e.g., the segmentation map 210, the segmentation map 220, and the segmentation map 230) each segment the image 205 (or downscaled variant(s) thereof) into different regions that represent different object types, material types, or substance types. Examples of different object types, material types, or substance types are labeled directly on the segmentation map 210 (and on the segmentation map 220 and the segmentation map 230) in FIG. 2, for instance identifying skin, hair, cloth, plants, buildings, sky, concrete, and the like. The lines illustrated within the segmentation maps illustrated in FIG. 2 represent boundaries between different regions representing different object types, material types, or substance types.

The image 205 is downscaled (e.g., using the downscaler) to a medium resolution 225 of 1024×768 to generate a downscaled variant of the image 205 having the medium resolution 225 of 1024×768. This downscaled variant of the image 205 (having the medium resolution 225 of 1024×768) is input into the segmentation network to generate the segmentation map 220 illustrated in FIG. 2.

The image 205 is either kept at its full resolution (if the full resolution is the high resolution 235 of 2048×1536) or downscaled (e.g., using the downscaler) to the high resolution 235 of 2048×1536 to generate a downscaled variant of the image 205 having the high resolution 235 of 2048×1536. This image 205 with the high resolution 235 of 2048×1536, or the downscaled variant of the image 205 (having the high resolution 235 of 2048×1536), is input into the segmentation network to generate the segmentation map 230 illustrated in FIG. 2.

The segmentation map 210 includes a number of segmentation artifacts 240, circled in FIG. 2 using circles drawn with dashed lines. The segmentation map 220 also includes segmentation artifacts 245, also circled in FIG. 2 using circles drawn with dashed lines. The segmentation map 230 has relatively few segmentation artifacts. For instance, in the segmentation map 210, the segmentation artifacts 240 include miscategorized regions to the left of the man's neck, to the left of the man's forehead, under the man's armpit, and around the man's pinkie finger. These miscategorized regions are miscategorized as belonging to a building, when they should be categorized as depicting skin, cloth, and/or plant, depending on the segmentation artifact 240. The "building" label is omitted from the segmentation map 210 due to how small these areas are, but even small miscategorized regions can cause issues if an image processing function relies on the segmentation map 210 to process the image 205. The segmentation map 220 includes a similar segmentation artifact 245 to the left of the man's neck, also miscategorized as belonging to a building. The segmentation map 230 includes fewer such miscategorizations than the segmentation map 210 or the segmentation map 220.

The segmentation map 210 includes more segmentation artifacts 240, and the segmentation map 220 also includes more segmentation artifacts 245. For instance, the man's eyebrows are not recognized in the segmentation map 210. Only small portions of the concrete sidewalk are recognized in both the segmentation map 210 and the segmentation map 220, with the full visible portion of the concrete sidewalk only recognized in the segmentation map 230. The man's eyes and mouth are also somewhat inaccurately recognized in the segmentation map 210, compared to the segmentation map 220 and the segmentation map 230.

Segmentation maps as discussed herein can also be referred to as segmentation masks or simply masks, as segmentation maps are generally used as masks for applying image processing functions to certain regions of an image to generate a processed image.

As illustrated in FIG. 2, generating a segmentation map from a higher-resolution image generally results in a higher-accuracy segmentation map than generating a segmentation map from a lower-resolution image. However, generating a segmentation map from a higher-resolution image uses significant computational resources. Some applications can have latency limitations that can constrain how much time is available for image processing, which can prevent devices from generating segmentation maps from higher-resolution images due to how long it takes to do so. Such applications can include, for example, extended reality (XR) applications (e.g., virtual reality (VR), augmented reality (AR), mixed reality (MR), or a combination thereof), visual simultaneous localization and mapping (VSLAM), pose tracking (e.g., with 3 degrees of freedom (3DoF) or 6 degrees of freedom (6DoF)), object tracking, vehicle driving assistance, autonomous vehicle routing and/or driving, video gaming, video-conferencing, or a combination thereof. Thus, in such applications, a device may need to generate a segmentation map from a lower-resolution (downscaled) image, then upscale the segmentation map and apply processing to the image according to the upscaled segmentation map. This is more efficient, but can result in segmentation errors (e.g., segmentation artifacts 240 and/or segmentation artifacts 245) and/or loss of accuracy.

Figure 3:
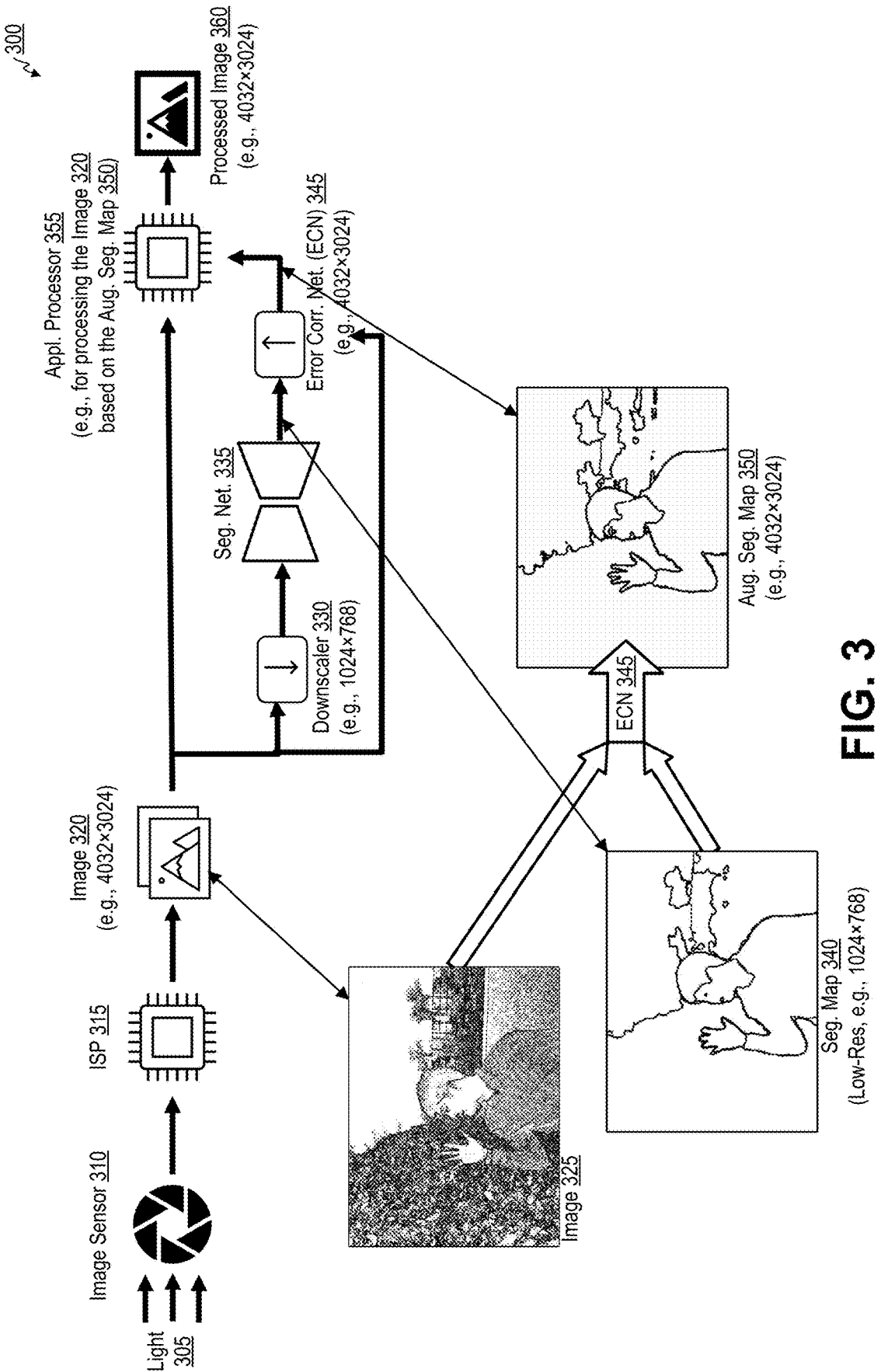
FIG. 3 is a block diagram illustrating an example architecture of an imaging system that generates a segmentation map from a downscaled variant of an image, that enhances the segmentation map using an error correction network to generate an augmented segmentation map, and that processes the image using the augmented segmentation map to generate a processed image, in accordance with some examples.

A trained machine learning (ML) model for segmentation map error correction, such as the error correction network (ECN) 345 of FIG. 3, is described herein for processing a segmentation map generated from a lower-resolution variant of an image, such as the segmentation map 210 or the segmentation map 220, and upscaling, correcting errors (e.g., such as the segmentation artifacts 240 and/or segmentation artifacts 245), warping to remove distortion (e.g., perspective distortion), or a combination thereof. The ECN can also use the original image (e.g., image 205) as an input, and can use aspects of the image—such as edges and/or color information—to correct errors in the segmentation map (e.g., segmentation artifacts 240 and/or segmentation artifacts 245), correct any warping, and upscale in a way that maintains or improves accuracy with respect to the original image (e.g., the image 205).

FIG. 3 is a block diagram illustrating an example architecture of an imaging system 300 that generates a segmentation map 340 from a downscaled variant of an image, that enhances the segmentation map 340 using an error correction network (ECN) 345 to generate an augmented segmentation map 350, and that processes the image using the augmented segmentation map to generate a processed image 360. The imaging system 300 includes an image sensor 310, such as the image sensor 130 of the image capture and processing system 100. The image sensor 310 receives light 305 from a scene, such as the scene 110. An image signal processor (ISP) 315 performs initial processing of the image data from the image sensor 310 to generate an image 320. The ISP 315 can be an example of the ISP 154, and can perform, for instance, demosaicking, denoising, sharpening, saturation adjustment, brightness adjustment, tone mapping, color space conversion, color correction, color interpolation, auto-white-balance, lens shading correction, defective or missing pixel correction, gamma correction, auto-exposure, auto-focus, any other operation discussed with respect to the ISP 154, or a combination thereof. The image 325 is an example of the image 320. In an illustrative example, the resolution of the image 320 is 4032×3024.

The imaging system 300 includes a downscaler 330 that downscales the image 320 to generate a downscaled variant of the image 320. The downscaler 330 can use nearest neighbor scaling, bilinear filtering, bicubic filtering, any other resizing or rescaling method, or a combination thereof. In an illustrative example, the downscaler 330 can downscale the image 320 to a resolution of 1024×768, so that the resulting downscaled variant of the image 320 has a resolution of 1024×768.

The imaging system 300 includes a segmentation network 335, which can receive the downscaled variant of the image 320 generated by the downscaler 330, and can output a segmentation map with the same resolution as the downscaled variant of the image 320. The segmentation map 340 is an example of the segmentation map generated by the segmentation network 335. In an illustrative example, downscaled variant of the image 320 has a resolution of 1024× 768, and thus the segmentation map also has a resolution of 1024×768. The segmentation network 335 can be a trained machine learning model, such as a semantic segmentation model. In some examples, the segmentation network 335 can include a trained encoder network, a corresponding decoder network, and a pixel-wise classification layer.

The imaging system 300 includes an error correction network (ECN) 345. The ECN 345 processes the segmentation map generated by the segmentation network 335 (e.g., the segmentation map 340) to generate an augmented segmentation map. The augmented segmentation map 350 is an example of the augmented segmentation map generated by the ECN 345. In some examples, the ECN 345 can generate the augmented segmentation map (e.g., the augmented segmentation map 350) based on receipt of both the image 320 (e.g., the image 325) and the segmentation map generated by the segmentation network 335 (e.g., the segmentation map 340) as inputs to the ECN 345. In some examples, the ECN 345 can use the image 320 to upscale the segmentation map generated by the segmentation network 335 (e.g., the segmentation map 340) and correct errors in the segmentation map (e.g., the segmentation map 340). The ECN 345 can upscale the segmentation map (e.g., the segmentation map 340) to the same resolution as the image 320 (e.g., a resolution of 4032×3024). The ECN 345 can upscale the segmentation map (e.g., the segmentation map 340) and correct errors in the segmentation map (e.g., the segmentation map 340) by using information from the image 320— such as edges in the image 320 and/or color information in the image 320—as a guide so that the upscaling aligns with the image 320 and to help correct errors (e.g., segmentation artifacts 240, segmentation artifacts 245, warping, etc.) in the segmentation map (e.g., the segmentation map 340), thus maintaining or improving accuracy of the boundaries of object types, material types, and/or substance types relative to the segmentation map (e.g., the segmentation map 340) and with respect to the original image (e.g., the image 205). The ECN 345 is a trained machine learning model as discussed further herein.

The imaging system 300 includes an application processor 355 that processes the image 320 based on the augmented segmentation map (e.g., augmented segmentation map 350) to generate a processed image 360. The host processor 152 is an example of the application processor 355. The application processor 355 can process different regions of the image 320 according to different processing settings to process the image 320 using the augmented segmentation map (e.g., augmented segmentation map 350). For instance, a first region in the augmented segmentation map that represents skin can correspond to a first processing setting corresponding to a first strength of an image processing function, while a second region in the augmented segmentation map that represents plants can correspond to a second processing setting corresponding to a second strength of the image processing function. For instance, the image processing function can include alterations to contrast, brightness, saturation, sharpness, levels, curves, tones, colors, any image processing functions discussed with respect to the host processor 152, any image processing functions discussed with respect to the ISP 154, any image processing functions discussed with respect to the image processor 150, any image processing functions discussed with respect to the ISP 315, any other image processing functions discussed herein, or a combination thereof. In an illustrative example, the application processor 355 can process a first region of the image 320 (aligning with the first region in the augmented segmentation map that represents skin) with a high strength of denoising, and can process a second region of the image 320 (aligning with the second region in the augmented segmentation map that represents plants) with a low strength of denoising.

Figure 4:
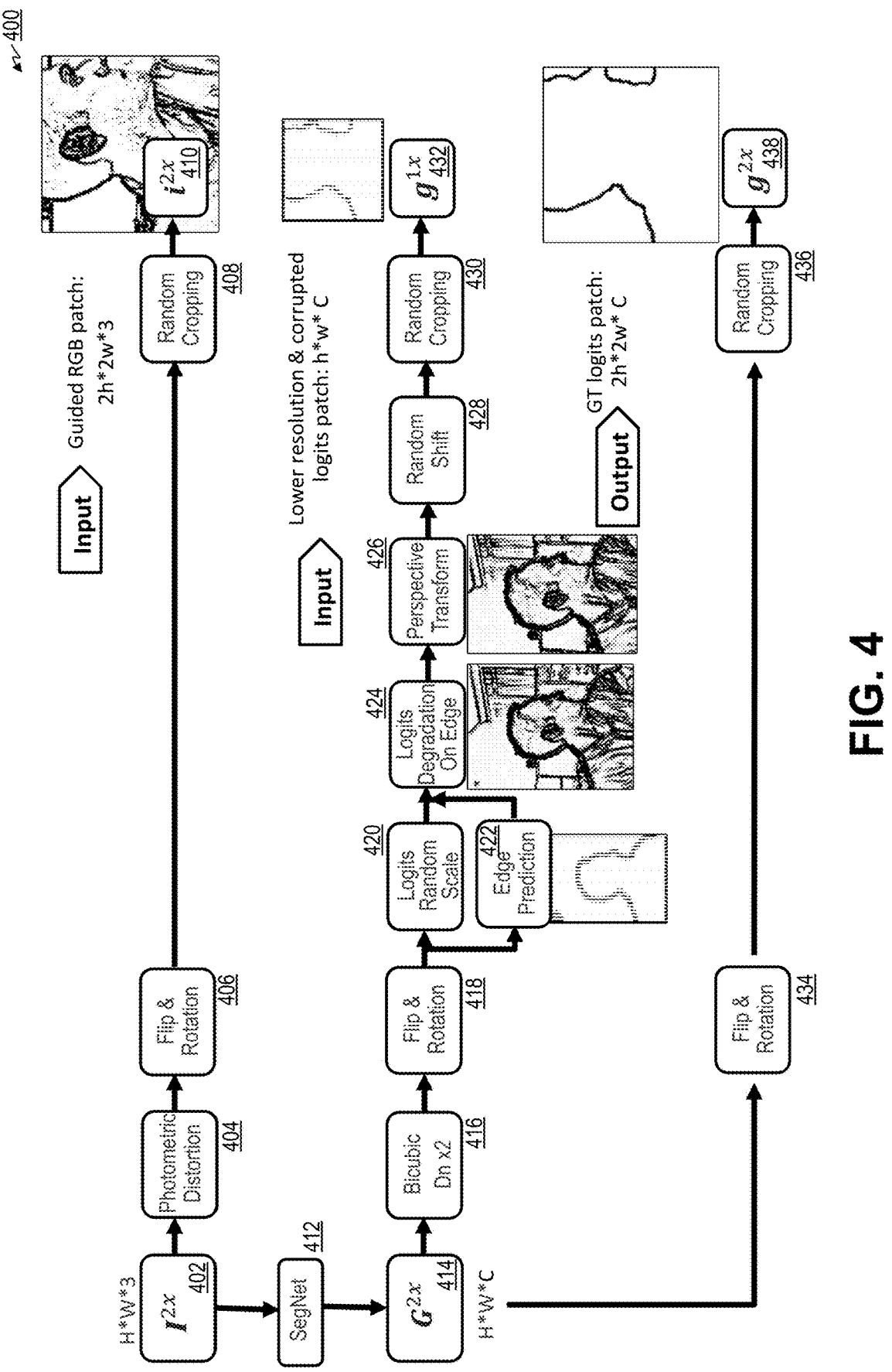
FIG. 4 is a block diagram illustrating a process for generating training data for training the error correction network of FIG. 3, in accordance with some examples.

FIG. 4 is a block diagram illustrating a process 400 for generating training data for training the error correction network (ECN) 345 of FIG. 3. The process 400 uses an image $I^{2x}$ 402 having a resolution of H×W and three color channels (e.g., red, green, blue), and therefore denoted as having dimensions H×W×3. The image $I^{2x}$ 402 is processed (using photometric distortion 404, flipping and/or rotation 406, and/or random cropping 408 of a random area in the image $I^{2x}$ 402) to generate an image patch $i^{2x}$ 410, which is used as one portion of training data for training the ECN 345. The image patch $i^{2x}$ 410 retains the three color channels of the image $I^{2x}$ 402, but has a different height (2h) and width (2w) than the height (H) and width (W) of the image $I^{2x}$ 402, with uppercase H representing a larger value than lowercase h, and uppercase W representing a larger value than lowercase w. Thus, the dimensions of the image patch $i^{2x}$ 410 are identified as 2h×2w×3.

The image $I^{2x}$ 402 is processed using a segmentation network 412 to generate a segmentation map $G^{2x}$ 414. The segmentation network 412 may be the same as the segmentation network 335 of FIG. 3, or may be different. Like the image $I^{2x}$ 402, the dimensions of the segmentation map $G^{2x}$ 414 are H×W. In some examples, the various object types may be indicated in the segmentation map $G^{2x}$ 414 by different colors in one or more color channels, by different numbers, by different codes, or some combination thereof. An amount of channels of data that represent the various object types indicated in the segmentation map $G^{2x}$ 414 can be identified as C. Thus, the dimensions of the segmentation map $G^{2x}$ 414 can be written as H×W×C.

The segmentation map $G^{2x}$ 414 is processed using a set of processing functions to generate a segmentation map patch $g^{1x}$ 432 having a low resolution (e.g., h×w×C) and various corruptions intended to introduce errors into the segmentation map patch $g^{1x}$ 432. For instance, as part of generating the segmentation map patch $g^{1x}$ 432, the segmentation map $G^{2x}$ 414 can be downscaled using a bicubic downscaling 416, for example being downscaled by a factor of 2 (e.g., a 2× downscaling). In some examples, different forms of downscaling can be used in place of bicubic downscaling 416, such as nearest neighbor downscaling or bilinear downscaling. The downscaled segmentation map can be flipped and/or rotated using a flipping and/or rotation 418. The flipping and/or rotation 418 can be the same as the flipping and/or rotation 406, or can include some slight variations relative to the flipping and/or rotation 406 to introduce more error(s) and/or corruption(s) into the segmentation map patch $g^{1x}$ 432. Edge prediction 422 or edge detection can be used on the resulting intermediate segmentation map to determine edges between different object types. Examples of predicted and/or detected edges are illustrated below the box in FIG. 4 representing the edge prediction 422 or edge detection. The intermediate segmentation map can be processed using a randomized scaling 420 (e.g., upscaling, downscaling, stretching, and/or warping). The resulting intermediate segmentation map can be processed using degradation 424 along the edge(s) detected using the edge prediction 422 or edge detection, for instance moving, blurring, upscaling, downscaling, stretching, and/or warping random pixels or groups of pixels along the edge in random directions. An example of an image with some degradation 424 applied is illustrated below the box in FIG. 4 representing the degradation 424. The resulting intermediate segmentation map can be processed using a perspective transform 426, for example skewing, warping, and/or distorting the image to appear to be captured from a slightly different perspective. An example of an image with some perspective transform 426 applied is illustrated below the box in FIG. 4 representing the perspective transform 426.

The resulting intermediate segmentation map can be processed using a random shift 428, for instance randomly moving the intermediate segmentation map up, down, left, and/or right by a randomized offset distance, so that the random cropping 430 that follows doesn't quite line up with the random cropping 408 used to generate the image patch $i^{2x}$ 410. The random cropping 430 can function similarly to the random cropping 408, but can crop the segmentation map patch $g^{1x}$ 432 to dimensions of h×w×C rather than 2h×2w×C as in the random cropping 408 used to generate the image patch $i^{2x}$ 410. Still, the proportion of the cropping in the random cropping 430 (e.g., percentage of width and/or height reduction) can match the proportion of the cropping in the random cropping 408 (e.g., percentage of width and/or height reduction), with the reduction in overall dimensions from 2h×2w×C to h×w×C being brought about by the bicubic downscaling 416.

In some examples, the various filters, transformations, and/or processing operations applied to the segmentation map $G^{2x}$ 414 to generate the segmentation map patch $g^{1x}$ 432 can be applied in a different order than illustrated in FIG. 4. In some examples, certain filters, transformations, and/or processing operations illustrated in FIG. 4 as being applied to the segmentation map $G^{2x}$ 414 to generate the segmentation map patch $g^{1x}$ 432 can be omitted. In some examples, certain filters, transformations, and/or processing operations not shown in FIG. 4 as being applied to the segmentation map $G^{2x}$ 414 to generate the segmentation map patch $g^{1x}$ 432 can nevertheless be included, for instance a processing operation that adds noise, a Gaussian filter or other blurring operation, another processing operation discussed herein, or a combination thereof.

The segmentation map $G^{2x}$ 414 is also processed more minimally with a flipping and/or rotation 434 and/or a random cropping 436 to generate a segmentation map patch $g^{2x}$ 438 having a higher resolution (e.g., 2h×2w×C) than the segmentation map patch $g^{1x}$ 432 and matching the resolution of the, without the various corruptions introduced into the segmentation map patch $g^{1x}$ 432 through some of the processing operations applied to the segmentation map $G^{2x}$ 414 to generate the segmentation map patch $g^{1x}$ 432. Thus, the segmentation map patch $g^{1x}$ 432 is a low-resolution and low-accuracy segmentation map patch akin to the segmentation map 210, while the segmentation map patch $g^{2x}$ 438 is a high-resolution and high-accuracy segmentation map patch akin to the segmentation map 230.

Within the training data, the segmentation map patch $g^{2x}$ 438 is identified as an output corresponding to inputs represented by the image patch $i^{2x}$ 410 and the segmentation map patch $g^{1x}$ 432. Thus, training the ECN 345 based on the training data trains, and encourages, the ECN 345 to generate an output similar to the segmentation map patch $g^{2x}$ 438 in response to input of inputs similar to the image patch $i^{2x}$ 410 and the segmentation map patch $g^{1x}$ 432. In the context of FIG. 3, the image patch $i^{2x}$ 410 is analogous to the image 320 (e.g., the image 325), the segmentation map patch $g^{1x}$ 432 is analogous to the segmentation map generated by the segmentation network 335 (e.g., the segmentation map 340), and the segmentation map patch $g^{2x}$ 438 is analogous to the augmented segmentation map output by the ECN 345 (e.g., the augmented segmentation map 350). By training the ECN 345 using the training data generated in the process 400, the ECN 345 is trained to enhance the segmentation map generated by the segmentation network 335 (e.g., the segmentation map 340) to generate the augmented segmentation map (e.g., the augmented segmentation map 350) via an enhancement that is analogous to an enhancement from the segmentation map patch $g^{1x}$ 432 to the segmentation map patch $g^{2x}$ 438.

In some examples, segmentation maps can be stored as logits, or multi-dimensional tensors. Thus, the term logit can be used herein to refer to a segmentation map or a patch or portion thereof.

FIG. 5 is a block diagram illustrating a process 500 for training the error correction network (ECN) 345 of FIG. 3 using the training data of FIG. 4. For instance, during training of the ECN 345, the segmentation map patch $g^{1x}$ 432 and the image patch $i^{2x}$ 410 are provided as inputs to the ECN 345. In response to receiving these inputs, the ECN 345 generates a predicted augmented segmentation map $p^{2x}$ 510. A training system compares the predicted augmented segmentation map $p^{2x}$ 510 to the segmentation map patch $g^{2x}$ 438 (the output in the training data) according to a loss function $\mathcal{L}_{total}$ 520. The ECN 345 is trained (e.g., using supervised learning or unsupervised learning or a combination thereof) to minimize the loss function $\mathcal{L}_{total}$ 520, to encourage the ECN 345 to generate and output an augmented segmentation map that is more like the segmentation map patch $g^{2x}$ 438 (the output in the training data representing ground truth) than the predicted augmented segmentation map $p^{2x}$ 510, especially if the loss function $\mathcal{L}_{total}$ 520 indicates that the segmentation map patch $g^{2x}$ 438 and the predicted augmented segmentation map $p^{2x}$ 510 have a high level of difference (which can be referred to as error or loss).

If the loss function $\mathcal{L}_{total}$ 520 indicates that the predicted augmented segmentation map $p^{2x}$ 510 is close to (e.g., matches by more than a threshold amount of pixels) the segmentation map patch $g^{2x}$ 438, the weights that helped generate the predicted augmented segmentation map $p^{2x}$ 510 can be strengthened in the ECN 345. If the loss function $\mathcal{L}_{total}$ 520 indicates that the predicted augmented segmentation map $p^{2x}$ 510 is far from (e.g., differs from by more than a threshold amount of pixels) the segmentation map patch $g^{2x}$ 438, the weights that helped generate the predicted augmented segmentation map $p^{2x}$ 510 can be weakened or removed in the ECN 345. In an illustrative example, the loss function $\mathcal{L}_{total}$ 520 indicated in Equation 1 can be used:

$$\mathcal{L}_{total} = \qquad\qquad\qquad\qquad\qquad \text{Equation 1}$$
$$\sum_{j}\mathcal{L}_{pair}(x_j) + \alpha * \sum_{j}\mathcal{L}_{class}(x_j) + \beta * \sum_{j,k}\mathcal{L}_{smooth}(x_j, x_k)$$

Within Equation 1 for the loss function $\mathcal{L}_{total}$ 520, $x_j$ and $x_k$ and denote the j-th and k-th pixels in the predicted augmented segmentation map $p^{2x}$ 510, respectively. Within Equation 1 for the loss function $\mathcal{L}_{total}$ 520, $\alpha$ and $\beta$ denote respective weights for the different terms in the loss function. In some examples, the weight $\alpha$ is associated with how closely the predicted augmented segmentation map $p^{2x}$ 510 matches the segmentation map patch $g^{2x}$ 438 (the output in the training data). In some examples, the weight $\beta$ is associated with maintaining smoothness within the predicted augmented segmentation map $p^{2x}$ 510, for example to discourage introducing holes or gaps within regions of the predicted augmented segmentation map $p^{2x}$ 510 or any future augmented segmentation map generated by the ECN 345.

Equation 1 for the loss function $\mathcal{L}_{total}$ 520 introduces a sub-function $\mathcal{L}_{pair}$ that can be calculated as indicated in Equation 2 below:

$$\mathcal{L}_{pair}(x_j) = \sqrt[2]{\left(p_t^{2x}(x_j) - g_t^{2x}(x_j)\right)^2} \qquad \text{Equation 2}$$

Equation 1 for the loss function $\mathcal{L}_{total}$ 520 introduces a sub-function $\mathcal{L}_{class}$ that can be calculated as indicated in Equation 3 below:

$$\mathcal{L}_{class}(x_j) = \left|\left(p_t^{2x}(x_j) - \mathbb{1}\left(g_t^{2x}(x_j)\right)\right)\right| \qquad \text{Equation 3}$$

Within the context of Equation 3, $\mathbb{1}$ represents one-hot encoding for segmentation categories, further explained via Equations 4 below:

$$\mathbb{1}\left(g^{2x}(x_j)\right) = [v_0, v_1, \ldots, v_{10}], \qquad \text{Equation 4}$$

$$v_n = \begin{cases} 1, & v_n = \text{argmax}_n\left(g^{2x}(x_j)\right), \\ 0, & v_n \neq \text{argmax}_n\left(g^{2x}(x_j)\right) \end{cases}$$

Equation 1 for the loss function $\mathcal{L}_{total}$ 520 introduces a sub-function $\mathcal{L}_{smooth}$ that can be calculated as indicated in Equation 5 below:

$$\mathcal{L}_{smooth}(x_j, x_k) = \sum_{x_k \in N(x_j)} 1(c_j, c_k)\left(p_t^{2x}(x_k) - p_t^{2x}(x_j)\right)^2 \qquad \text{Equation 5}$$

Within the context of Equation 5, 1 is an indicator function for a same category.

Figure 6:
FIG. 6 is a block diagram illustrating an example of an architecture of the error correction network (ECN) of FIG. 3 that receives an image $i^{2x}$ and a segmentation map $g^{1x}$ (that is based on the image $i^{2x}$ and that has a low resolution), and that generates augmented segmentation map $p^{2x}$ (that is based on the image $i^{2x}$ and the segmentation map $g^{1x}$ and that has a high resolution), in accordance with some examples.

FIG. 6 is a block diagram illustrating an example of an architecture 600 of the error correction network (ECN) 345 of FIG. 3 that receives an image $i^{2x}$ 610 and a segmentation map $g^{1x}$ 605 (that is based on the image $i^{2x}$ 610 and that has a low resolution), and that generates augmented segmentation map $p^{2x}$ 615 (that is based on the image $i^{2x}$ 610 and the segmentation map $g^{1x}$ 605 and that has a high resolution). The image $i^{2x}$ 610 has a resolution of 2h×2w×C, and is an example of the image 320 and the image patch $i^{2x}$ 410. The segmentation map $g^{1x}$ 605 has a resolution of h×w×C, and is an example of the segmentation map generated by the segmentation network 335 in FIG. 3 (e.g., the segmentation map 340) and the segmentation map patch $g^{1x}$ 432. The augmented segmentation map $p^{2x}$ 615 has a resolution of 2h×2w×C, and is an example of the augmented segmentation map generated by the ECN 345 in FIG. 3 (e.g., the augmented segmentation map 350) and the predicted augmented segmentation map $p^{2x}$ 510.

The architecture 600 of the ECN 345 includes a bilinear upscaler 620 that upscales the segmentation map $g^{1x}$ 605 to generate an upscaled segmentation map $g^{2x}$ 625. The architecture 600 of the ECN 345 includes a number of permutations down (PD) by 2 (PD×2) or by 4 (PD×4), concatenations (Concat), convolutions (Conv2D), activation functions such as Parametric Rectified Linear Unit (PRELU) functions, additions, and permutations up (PU) by 2 (PU×2) or by 4 (PU×4), ultimately generating a residual r 630. The ECN 345 generates downscaled tensor(s) with dimensions h×w×C' along the way to generating the residual r 630, where C'=(12+C). The ECN 345 calculates the augmented segmentation map $p^{2x}$ 615 by adding the residual r 630 to the upscaled segmentation map $\tilde{g}^{2x}$ 625, for instance using the equation $p^{2x}=\tilde{g}^{2x}+r$. The architecture 600 of the ECN 345 is illustrated as a U-Net architecture and/or a fully convolutional neural network. In some examples, the architecture 600 of the ECN 345 can be a different type of neural network (e.g., of any of the types discussed with respect to the neural network 1200) or a different type of machine learning model. The neural network 1200 can be an example of the ECN 345. The ECN 345 can be an example of the neural network 1200.

Figure 7:
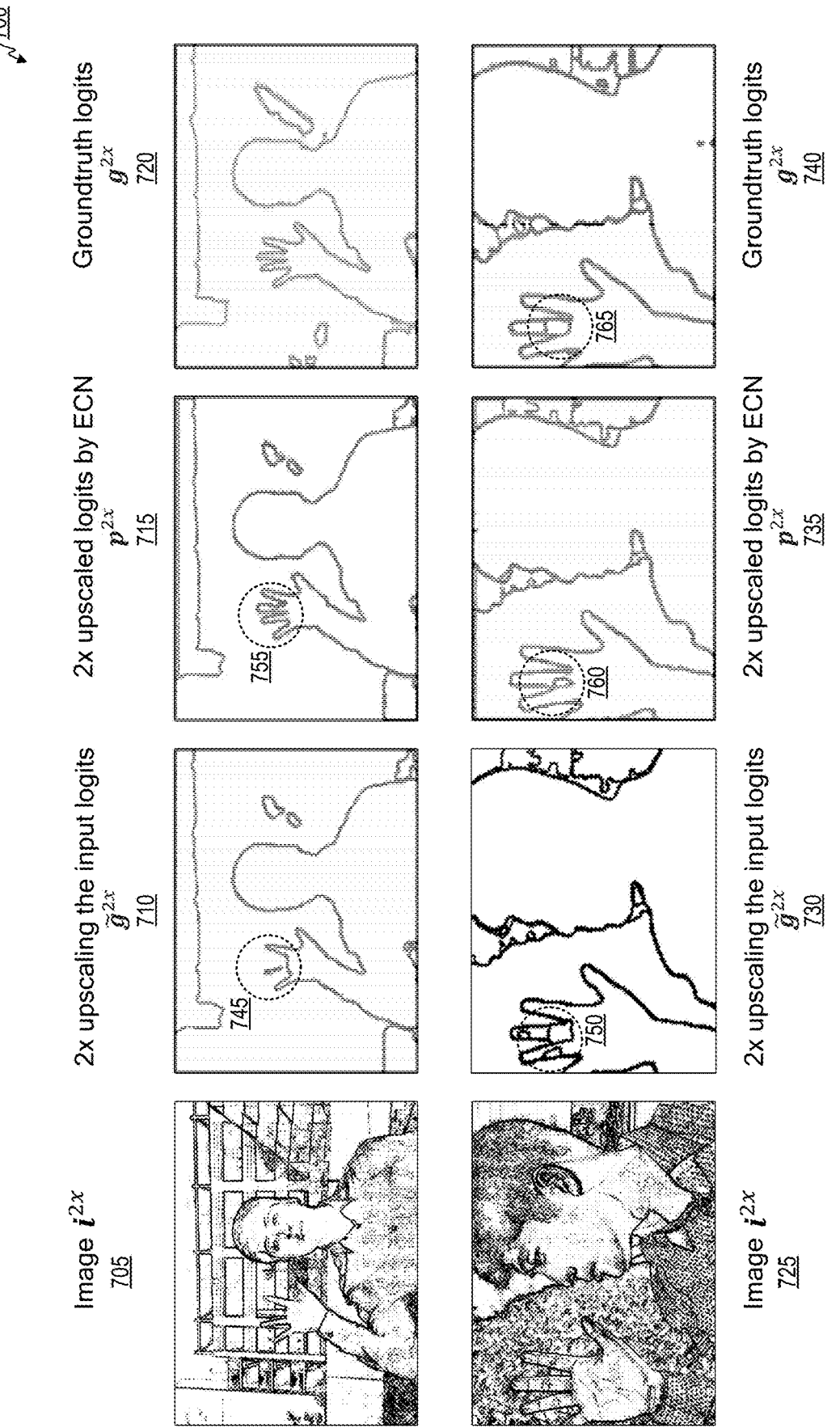
FIG. 7 is a conceptual diagram illustrating examples of images $i^{2x}$, upscaled segmentation maps $\tilde{g}^{2x}$ (based on low resolution segmentation maps $g^{1x}$) generated based on the images $i^{2x}$, augmented segmentation maps $p^{2x}$ (with higher resolutions) generated based on the segmentation maps $g^{1x}$ and the images $i^{2x}$, and ground truth segmentation maps $g^{2x}$ (with high resolutions) generated based on the images $i^{2x}$ for comparison, in accordance with some examples.

FIG. 7 is a conceptual diagram 700 illustrating examples of images $i^{2x}$, upscaled segmentation maps $\tilde{g}^{2x}$ (based on low resolution segmentation maps $g^{1x}$) generated based on the images $i^{2x}$, augmented segmentation maps $p^{2x}$ (with higher resolutions) generated based on the segmentation maps $g^{1x}$ and the images $i^{2x}$, and ground truth segmentation maps $g^{2x}$ (with high resolutions) generated based on the images $i^{2x}$ for comparison.

For instance, a first image $i^{2x}$ 705 depicts a man with his right hand raised with all 5 fingers extended, standing on grass in front of a concrete wall, with a building and sky visible behind the concrete wall and behind the man's head. In the context of the architecture 600 of the ECN 345, the first image $i^{2x}$ 705 is an example of the image $i^{2x}$ 610. The downscaler 330, the segmentation network 335, and the bilinear upscaler 620 are used to generate the upscaled segmentation map $g^{2x}$ 710, which is an example of the upscaled segmentation map $\tilde{g}^{2x}$ 625. The upscaled segmentation map $\tilde{g}^{2x}$ 710 includes a segmentation artifact 745, notably with two of the man's fingers fully or partially unrecognized as skin by the upscaled segmentation map $\tilde{g}^{2x}$ 710, instead being miscategorized as background (e.g., as part of the building). The ECN 345 is used to generate the augmented segmentation map $p^{2x}$ 715, which includes a correction 755 to the categorization of the man's hand, correctly recognizing and categorizing all five fingers as skin, correcting the segmentation artifact 745 from the upscaled segmentation map $\tilde{g}^{2x}$ 710. The ground truth segmentation map $g^{2x}$ 720 is generated by applying the segmentation network 335 on the full-resolution version of the first image $i^{2x}$ 705 (without using the downscaler 330 first), similarly to the generation of the segmentation map patch $g^{2x}$ 438. The ground truth segmentation map $g^{2x}$ 720 also correctly recognizes and categorizes all five of the man's fingers as skin, but as discussed previously is prohibitively computationally expensive to generate and is illustrated in FIG. 7 mainly for comparison. The augmented segmentation map $p^{2x}$ 715 is closer in accuracy to the ground truth segmentation map $g^{2x}$ 720 than the upscaled segmentation map $\tilde{g}^{2x}$ 710, for instance based on the correction 755, but is much more efficient to generate than the ground truth segmentation map $g^{2x}$ 720 is.

Similarly, a second image $i^{2x}$ 725 depicts a closeup man with his head turned to his right and his right hand raised with all 5 fingers extended, standing in front of a bush and sky visible on his right and a grassy field with concrete sidewalk and a building and sky visible on his left. In the context of the architecture 600 of the ECN 345, the second image $i^{2x}$ 725 is an example of the image $i^{2x}$ 610. The downscaler 330, the segmentation network 335, and the bilinear upscaler 620 are used to generate the upscaled segmentation map $\tilde{g}^{2x}$ 730, which is an example of the upscaled segmentation map $\tilde{g}^{2x}$ 625. The upscaled segmentation map $\tilde{g}^{2x}$ 730 includes a segmentation artifact 750, notably with two of the man's fingers including patches that are unrecognized as skin by the upscaled segmentation map $\tilde{g}^{2x}$ 730, instead being miscategorized as background (e.g., as part of the building). The ECN 345 is used to generate the augmented segmentation map $p^{2x}$ 735, which includes a correction 760 to the categorization of the man's hand, more correctly recognizing and categorizing all five fingers as skin, correcting the segmentation artifact 750 from the upscaled segmentation map $\tilde{g}^{2x}$ 730. The ground truth segmentation map $g^{2x}$ 740 is generated by applying the segmentation network 335 on the full-resolution version of the second image $i^{2x}$ 725 (without using the downscaler 330 first), similarly to the generation of the segmentation map patch $g^{2x}$ 438. Interestingly, while the augmented segmentation map $p^{2x}$ 735 still retains a small segmentation error on the man's middle finger, the segmentation error in the augmented segmentation map $p^{2x}$ 735 is actually smaller than the segmentation error on the man's middle finger in the ground truth segmentation map $g^{2x}$ 740. Thus, in the illustrated example of the segmentation mapping of the second image $i^{2x}$ 725, the augmented segmentation map $p^{2x}$ 735 is actually more accurate than the ground truth segmentation map $g^{2x}$ 740, and more efficient to generate as well.

Figure 8:
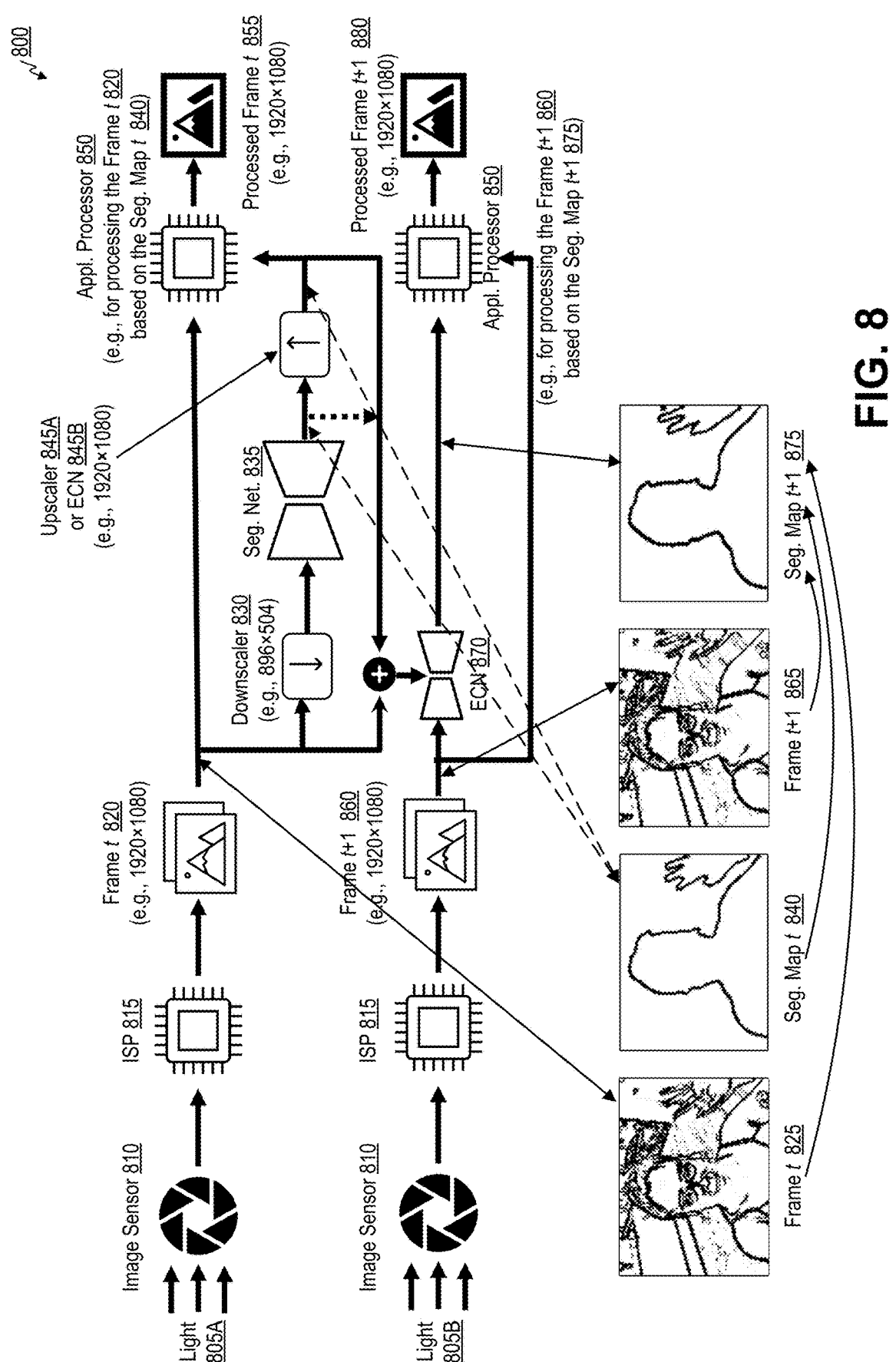
FIG. 8 is a block diagram illustrating an example architecture of an imaging system that uses an error correction network to generate segmentation maps for two video frames of a video, in accordance with some examples.

FIG. 8 is a block diagram illustrating an example architecture of an imaging system 800 that uses an error correction network (ECN) 870 to generate segmentation maps for two video frames of a video. The imaging system 800 includes an image sensor 810, such as the image sensor 130 of the image capture and processing system 100 or the image sensor 310 of the imaging system 300 of FIG. 3. The image sensor 810 receives light 805A from a scene (such as the scene 110) at a time t, and an image signal processor (ISP) 815 performs initial processing of the image data from the image sensor 810 at the time t to generate a frame t 820 representing the light 805A from the scene at the time t. The image sensor 810 receives light 805B from the scene at a time t+1, and the ISP 815 performs initial processing of the image data from the image sensor 810 at the time t to generate a frame t+1 860 representing the light 805B from the scene at the time t+1. The ISP 815 can be an example of the ISP 154 and/or the ISP 315, and can perform, for instance, demosaicking, denoising, sharpening, saturation adjustment, brightness adjustment, tone mapping, color space conversion, color correction, color interpolation, auto-white-balance, lens shading correction, defective or missing pixel correction, gamma correction, auto-exposure, auto-focus, any other operation discussed with respect to the ISP 154, any other operation discussed with respect to the ISP 315, or a combination thereof. In an illustrative example, the resolution of the frame t 820 and of the frame t+1 860 is 1920×1080. The frame t 825 is an example of the frame t 820. The frame t+1 865 is an example of the frame t+1 860.

The imaging system 800 includes a downscaler 830 that downscales the frame t 820 to generate a downscaled variant of the frame t 820. The downscaler 830 can be an example of the downscaler 330, and can use any of the same downscaling techniques. In an illustrative example, the downscaler 830 can downscale the frame t 820 to a resolution of 896×504, so that the resulting downscaled variant of the frame t 820 has a resolution of 896×504.

The imaging system 800 includes a segmentation network 835, which can receive the downscaled variant of the frame t 820 generated by the downscaler 830, and can output a segmentation map t that corresponds to the frame t 820 and has the same resolution as the downscaled variant of the frame t 820. In an illustrative example, downscaled variant of the frame t 820 has a resolution of 896×504, and thus the segmentation map t also has a resolution of 896×504.

The imaging system 800 includes an application processor 850. The application processor 850 can be an example of the application processor 355. The application processor processes the frame t 820 based on a segmentation map t corresponding to the frame t 820 to generate a processed frame t 855. The application processor processes the frame t+1 860 based on a segmentation map t+1 corresponding to the frame t+1 860 to generate a processed frame t+1 880.

In some examples, the imaging system 800 includes an upscaler 845A, such as a nearest neighbor upscaler, a bilinear upscaler (e.g., the bilinear upscaler 620), a bicubic upscaler, or a combination thereof. The imaging system 800 can apply the upscaler 845A to the segmentation map t for the frame t 820 generated by the segmentation network 835 to generate an upscaled segmentation map t. In examples where the imaging system 800 includes the upscaler 845A, the application processor 850 can use the upscaled segmentation map t to process the frame t 820 based on the upscaled segmentation map t to generate the processed frame t 855.

In some examples, the imaging system 800 includes an ECN 845B, which may be an example of the ECN 345 discussed with respect to FIGS. 3-7. The imaging system 800 can apply the ECN 845B to the segmentation map t for the frame t 820 generated by the segmentation network 835 to generate an augmented segmentation map t that is upscaled and included error corrections relative to the segmentation map t for the frame t 820 generated by the segmentation network 835. In examples where the imaging system 800 includes the ECN 845B, the application processor 850 can use the augmented segmentation map t to process the frame t 820 based on the augmented segmentation map t to generate the processed frame t 855.

The imaging system 800 includes an ECN 870 that generates a segmentation map t+1 corresponding to the frame t+1 860. The ECN 870 receives three inputs: the frame t 820, a segmentation map t corresponding to the frame t 820, and the frame t+1 860. In some examples, the segmentation map t that is input into the ECN 870 is the segmentation map t as generated by the segmentation network 835, without application of the upscaler 845A or the ECN 845B. In some examples, the segmentation map t that is input into the ECN 870 is the segmentation map t after the segmentation map t is processed using the upscaler 845A and/or the ECN 845B. For instance, in examples where the imaging system 800 includes the upscaler 845A, the segmentation map t that is input into the ECN 870 can be the upscaled segmentation map t generated by the upscaler 845A. In examples where the imaging system 800 includes the ECN 845B, the segmentation map t that is input into the ECN 870 can be the augmented segmentation map t generated by the ECN 845B.

In some examples, the segmentation map t 840 illustrated at the bottom of FIG. 8 is an example of the segmentation map t as generated by the segmentation network 835, without application of the upscaler 845A or the ECN 845B. In some examples, the segmentation map t 840 illustrated at the bottom of FIG. 8 is an example of the segmentation map t after the segmentation map t is processed using the upscaler 845A and/or the ECN 845B. For instance, in examples where the imaging system 800 includes the upscaler 845A, the segmentation map t 840 illustrated at the bottom of FIG. 8 can be an example of the upscaled segmentation map t generated by the upscaler 845A. In examples where the imaging system 800 includes the ECN 845B, the segmentation map t 840 illustrated at the bottom of FIG. 8 can be an example of the augmented segmentation map t generated by the ECN 845B.

The ECN 870 interpolates the segmentation map t+1 corresponding to the frame t+1 860 based on the segmentation map t corresponding to the frame t 820, the frame t 820, and the frame t+1 860. In some examples, the ECN 870 recognizes a difference between the frame t 820 and the frame t+1 860, and manipulates the segmentation map t based on the difference to generate the segmentation map t+1. In some examples, the ECN 870 recognizes a difference between the frame t 820 and the segmentation map t, and applies a corresponding transformation to the frame t+1 860 to generate the segmentation map t+1. The segmentation map t+1 875 illustrated at the bottom of FIG. 8 is an example of the segmentation map t+1 corresponding to the frame t+1 860. For instance, in an illustrative example, the ECN 870 can generate the segmentation map t+1 875 based on receiving inputs of the frame t 825, the segmentation map t 840, and the frame t+1 860.

In examples where the ECN 870 receives the segmentation map t as generated by the segmentation network 835, without application of the upscaler 845A or the ECN 845B, the ECN 870 can be trained to upscale the segmentation map t and/or the segmentation map t+1. In examples where the ECN 870 receives the segmentation map t after the segmentation map t is processed using the upscaler 845A and/or the ECN 845B, the ECN 870 need not be trained to upscale the segmentation map t and/or the segmentation map t+1.

In some examples, the application processor 850 can process different regions of the frame t 820 (identified using the segmentation map t) according to different processing settings to process the frame t 820 to generate the processed frame t 855. In some examples, the application processor 850 can process different regions of the frame t+1 860 (identified using the segmentation map t+1) according to different processing settings to process the frame t+1 860 to generate the processed frame t+1 880.

In some examples, the imaging system 800 can apply the process illustrated in FIG. 8 for subsequent frames after the frame t+1 860 as well. For instance, after the imaging system 800 generates the segmentation map t+1 corresponding to the frame t+1 860, the imaging system 800 can use the ECN 870 to generate a segmentation map t+2 corresponding to a frame t+2, to generate a segmentation map t+3 corresponding to a frame t+3, and so forth. In some examples, after the imaging system 800 generates the segmentation map t+1 corresponding to the frame t+1 860, the imaging system 800 can treat frame t+1 860 as a new frame t, and can treat the segmentation map t+1 as a new segmentation map t, can treat frame t+2 as a new frame t+1, and can treat segmentation map t+2 as a new segmentation map t+1. In this way, the imaging system 800 can generate each subsequent segmentation map based on the previous frame, the previous segmentation map, and the current frame. In some examples, the imaging system 800 need not use the downscaler 830, segmentation network 835, upscaler 845A, and/or ECN 845B after the first use (as illustrated with respect to generating the segmentation map t for the frame t 820 in FIG. 8). In some examples, the imaging system 800 can periodically generate segmentation maps using the downscaler 830, segmentation network 835, upscaler 845A, and/or ECN 845B to prevent cumulative interpolation errors, for instance every 5 frames, every 10 frames, every 15 frames, every 20 frames, or once an error is detected.

The ECN 870 provides a significant reduction in power usage and computational resource usage over generation of segmentation maps using the downscaler 830, segmentation network 835, upscaler 845A, and/or ECN 845B for every frame. For instance, running the ECN 870 can be more efficient than running the segmentation network 835. In an illustrative example, running the segmentation network 835 uses 1 watt of energy, while running the ECN 870 uses 0.25 watts of energy. To generate a series of five consecutive segmentation maps, the first segmentation map generated using the segmentation network 835 and the subsequent four generated using the ECN 870, would only use 2 watts, calculated as 1 W+4*(0.25 W). In comparison, using the segmentation network 835 to generate all five segmentation maps would use 5 watts. In some examples, this power reduction for the subsequent frames can be leveraged to generate the first segmentation map at a higher resolution (e.g., omitting the downscaler 830 or using a downscaler 830 that doesn't downscale quite as much). By starting with a higher accuracy segmentation map t, subsequent segmentation maps (e.g., segmentation map t+1, segmentation map t+2, etc.) benefit from the increased accuracy of the first segmentation map t. Thus, use of the ECN 870 can ultimately reduce workload in video segmentation networks and improve temporal consistency and accuracy in videos.

Figure 9:
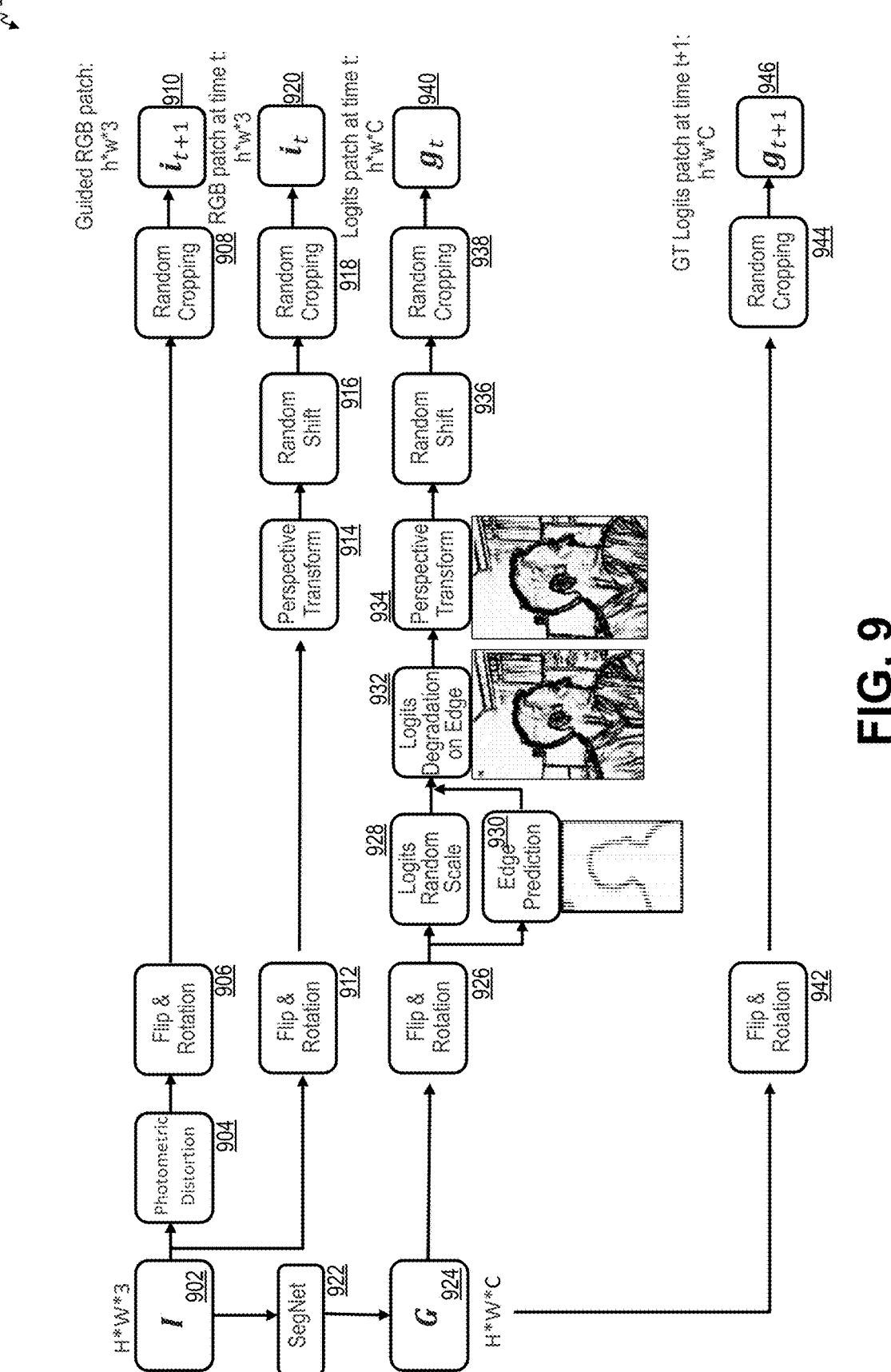
FIG. 9 is a block diagram illustrating a process for generating training data for training the error correction network of FIG. 8, in accordance with some examples.

FIG. 9 is a block diagram illustrating a process for generating training data for training the error correction network of FIG. 8. The process 900 uses an image I 902 having a resolution of H×W and three color channels (e.g., red, green, blue), and therefore denoted as having dimensions H×W×3. The image I 902 is processed (using photometric distortion 904, flipping and/or rotation 906, and/or random cropping 908 of a random area in the image I 902) to generate an image patch $i_{t+1}$ 910 representing a frame t+1 of a video (e.g., the frame t+1 860). The image I 902 is also processed (using flipping and/or rotation 912, perspective transform 914, random shift 916, and/or random cropping 918) to generate an image patch $i_t$ 920 representing a frame t of the video (e.g., the frame t 820). The image patch $i_t$ 920 and the image patch $i_{t+1}$ 910 can include subtle differences, mimicking subtle differences from one video frame to another. These subtle differences can be generated through the use of the perspective transform 914 to change perspective from the image I 902 to the image patch $i_t$ 920, thus providing a change in perspective between the image patch $i_t$ 920 and the image patch $i_{t+1}$ 910. These subtle differences can also be generated through the use of the random shift 916 to translationally move the image I 902 by an offset before using the random cropping 918 to generate the image patch $i_t$ 920, mimicking a translational movement in the camera between the image patch $i_t$ 920 and the image patch $i_{t+1}$ 910. These subtle differences can also be generated through the use of the photometric distortion 904 for generating the image patch $i_{t+1}$ 910 but not for generating the image patch $i_t$ 920. The flipping and/or rotation 912 can be the same as the flipping and/or rotation 906, or can include some slight variations relative to the flipping and/or rotation 906 to introduce further subtle differences between the image patch $i_t$ 920 and the image patch $i_{t+1}$ 910 (e.g., mimicking rotational movement of the camera). The random cropping 918 can be the same as the random cropping 908, or can include some slight variations relative to the random cropping 908 to introduce further subtle differences between the image patch $i_t$ 920 and the image patch $i_{t+1}$ 910. The image patch $i_t$ 920 and the image patch $i_{t+1}$ 910 both have dimensions of h×w×3.

In some examples, the various filters, transformations, and/or processing operations applied to the image I 902 to generate the image patch $i_t$ 920 can be applied in a different order than illustrated in FIG. 9. In some examples, certain filters, transformations, and/or processing operations illustrated in FIG. 9 as being applied to the image I 902 to generate the image patch $i_t$ 920 can be omitted. In some examples, certain filters, transformations, and/or processing operations not shown in FIG. 9 as being applied to the image I 902 to generate the image patch $i_t$ 920 can nevertheless be included, for instance a processing operation that adds edge degradation, noise, a Gaussian filter or other blurring operation, another processing operation discussed herein, or a combination thereof.

The image I 902 is processed using a segmentation network 922 to generate a segmentation map G 924. The segmentation network 922 may be the same as the segmentation network 335 of FIG. 3, the segmentation network 412 of FIG. 4, the segmentation network 835 of FIG. 8, a segmentation network, or a combination thereof. Like segmentation map $G^{2x}$ 314 of FIG. 4, the segmentation map G 924 has dimensions of as H×W×C.

The segmentation map G 924 is processed using a set of processing functions to generate a segmentation map patch $g_t$ 940 corresponding to the image patch $i_t$ 920 (e.g., both corresponding to a time t). In some examples, the segmentation map patch $g_t$ 940 has the same dimensions and/or resolution (e.g., h×w×C) as the to the image patch $i_t$ 920. In some examples, the process 900 applies various image processing operations (e.g., corruptions) to the segmentation map G 924 that are intended to introduce errors into the segmentation map patch $g_t$ 940. For instance, as part of generating the segmentation map patch $g_t$ 940, the segmentation map G 924 can be flipped and/or rotated using a flipping and/or rotation 926. The flipping and/or rotation 926 can be the same as the flipping and/or rotation 906 and/or the flipping and/or rotation 912, or can include some slight variations relative to the flipping and/or rotation 906 and/or the flipping and/or rotation 912 to introduce more error(s) and/or corruption(s) into the segmentation map patch $g_t$ 940. Edge prediction 930 or edge detection can be used on the resulting intermediate segmentation map to determine edges between different object types. Examples of predicted and/or detected edges are illustrated below the box in FIG. 9 representing the edge prediction 930 or edge detection. The intermediate segmentation map can be processed using a randomized scaling 928 (e.g., upscaling, downscaling, stretching, and/or warping). The resulting intermediate segmentation map can be processed using degradation 932 along the edge(s) detected using the edge prediction 930 or edge detection, for instance moving, blurring, upscaling, downscaling, stretching, and/or warping random pixels or groups of pixels along the edge in random directions. An example of an image with some degradation 932 applied is illustrated below the box in FIG. 9 representing the degradation 932. The resulting intermediate segmentation map can be processed using a perspective transform 934, for example skewing, warping, and/or distorting the image to appear to be captured from a slightly different perspective. An example of an image with some perspective transform 934 applied is illustrated below the box in FIG. 9 representing the perspective transform 934.

The resulting intermediate segmentation map can be processed using a random shift 936, for instance randomly moving the intermediate segmentation map up, down, left, and/or right by a randomized offset distance, so that the random cropping 938 that follows doesn't quite line up with the random cropping 908 used to generate the image patch $i_{t+1}$ 910. In some examples, the random shift 936 and/or random cropping 938 can shift and/or crop in the same way as the random shift 916 and/or the random cropping 918, to align the segmentation map patch $g_t$ 940 with the image patch $i_t$ 920. In some examples, the random shift 936 and/or random cropping 938 can shift and/or crop in different ways than the random shift 916 and/or the random cropping 918, to introduce further error(s) and/or corruption(s) into the segmentation map patch $g_t$ 940 relative to the image patch $i_t$ 920. In some examples, the dimensions of the segmentation map patch $g_t$ 940 are hxwxC.

In some examples, the various filters, transformations, and/or processing operations applied to the segmentation map G 924 to generate the segmentation map patch $g_t$ 940 can be applied in a different order than illustrated in FIG. 9. In some examples, certain filters, transformations, and/or processing operations illustrated in FIG. 9 as being applied to the segmentation map G 924 to generate the segmentation map patch $g_t$ 940 can be omitted. In some examples, certain filters, transformations, and/or processing operations not shown in FIG. 9 as being applied to the segmentation map G 924 to generate the segmentation map patch $g_t$ 940 can nevertheless be included, for instance a processing operation that adds noise, a Gaussian filter or other blurring operation, another processing operation discussed herein, or a combination thereof.

The segmentation map G 924 is also processed more minimally with a flipping and/or rotation 942 and/or a random cropping 944 to generate a segmentation map patch $g_{t+1}$ 946 corresponding to the image patch $i_{t+1}$ 910 and to the time t+1. The segmentation map patch $g_{t+1}$ 946 matches the resolution of the segmentation map patch $g_t$ 940 (e.g., hxwxC) but without the various filters, distortions, transformations, corruptions, and/or corruptions introduced into the segmentation map patch $g_t$ 940 through some of the processing operations applied to the segmentation map G 924 to generate the segmentation map patch $g_t$ 940. The image patch $i_{t+1}$ 910 and the segmentation map patch $g_{t+1}$ 946 are more minimally processed than the image patch $i_t$ 920 and the segmentation map patch $g_t$ 940, ensuring that the output in the training data—the segmentation map patch $g_{t+1}$ 946—retains a high level of image quality.

Within the training data, the segmentation map patch $g_{t+1}$ 946 is identified as an output corresponding to inputs represented by the image patch $i_{t+1}$ 910, the image patch $i_t$ 920, and the segmentation map patch $g_t$ 940. Thus, training the ECN 870 based on the training data trains, and encourages, the ECN 870 to generate an output similar to the segmentation map patch $g_{t+1}$ 946 in response to input of inputs similar to the image patch $i_{t+1}$ 910, the image patch $i_t$ 920, and the segmentation map patch $g_t$ 940. In the context of FIG. 8, the image patch $i_t$ 920 is analogous to the frame t 820 (e.g., the frame t 825), the image patch $i_{t+1}$ 910 is analogous to the frame t+1 860 (e.g., the frame t+1 865), the segmentation map patch $g_t$ 940 is analogous to the segmentation map t (e.g., generated by the segmentation network 835 and/or processed using the upscaler 845A and/or the ECN 845B) (e.g., the segmentation map t 840), and the segmentation map patch $g_{t+1}$ 946 is analogous to the segmentation map t+1 (e.g., the segmentation map t+1 875).

Figure 10:
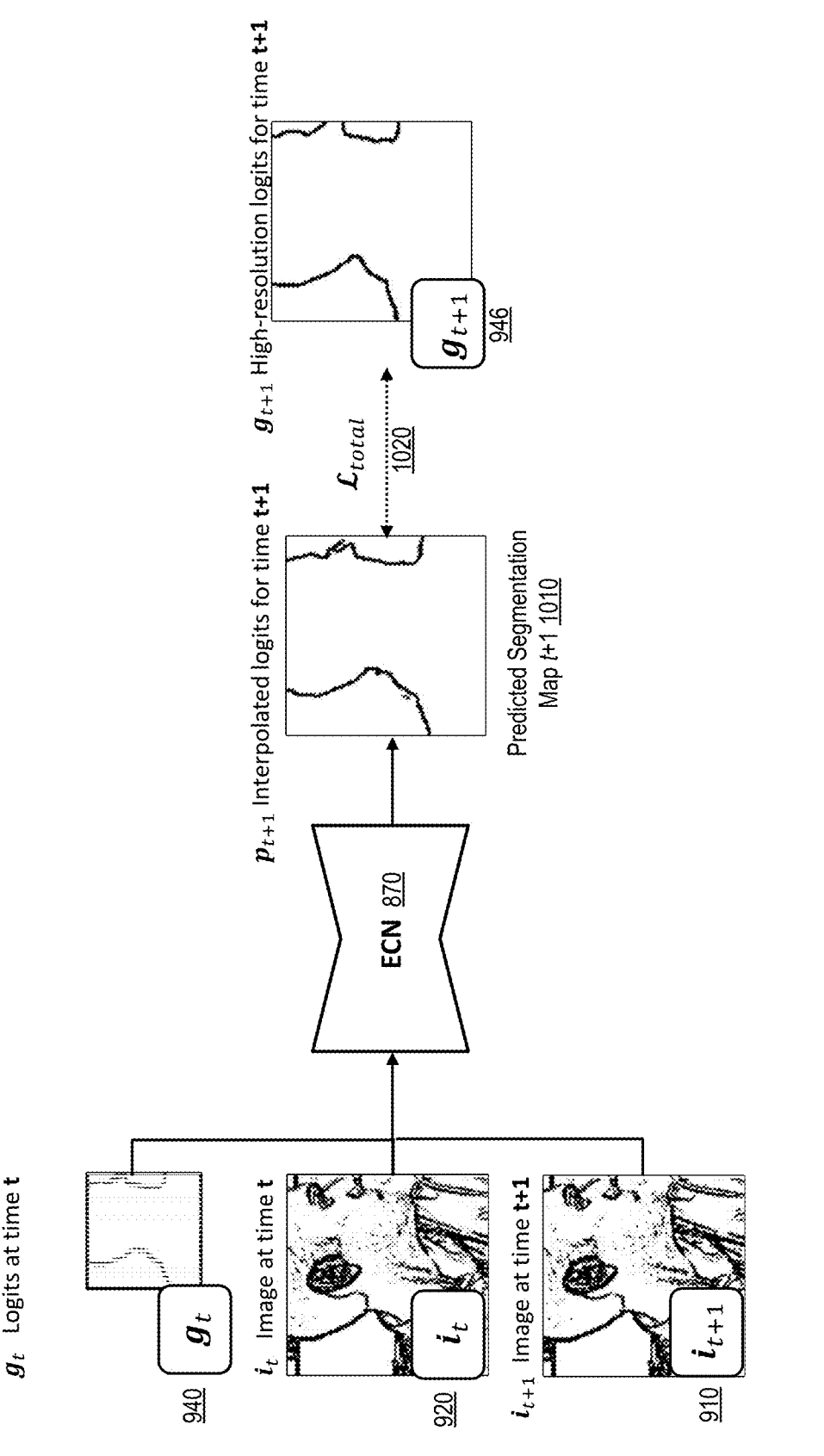
FIG. 10 is a block diagram illustrating a process for training the error correction network of FIG. 8 using the training data of FIG. 9, in accordance with some examples.

FIG. 10 is a block diagram illustrating a process for training the error correction network of FIG. 8 using the training data of FIG. 9. For instance, during training of the ECN 870, the image patch $i_{t+1}$ 910, the image patch $i_t$ 920, and the segmentation map patch $g_t$ 940 are provided as inputs to the ECN 870. In response to receiving these inputs, the ECN 870 generates a predicted segmentation map t+1 $p_{t+1}$ 1010. A training system compares the predicted segmentation map t+1 $p_{t+1}$ 1010 to the segmentation map patch $g_{t+1}$ 946 (the output in the training data representing ground truth) according to a loss function $\mathcal{L}_{total}$ 1020. The ECN 870 is trained (e.g., using supervised learning or unsupervised learning or a combination thereof) to minimize the loss function $\mathcal{L}_{total}$ 1020, to encourage the ECN 870 to generate and output an augmented segmentation map that is more like the segmentation map patch $g_{t+1}$ 946 (the output in the training data) than the predicted segmentation map t+1 $p_{t+1}$ 1010, especially if the loss function $\mathcal{L}_{total}$ 1020 indicates that the segmentation map patch $g_{t+1}$ 946 and the predicted segmentation map t+1 $p_{t+1}$ 1010 have a high level of difference (which can be referred to as error or loss).

If the loss function $\mathcal{L}_{total}$ 1020 indicates that the predicted segmentation map t+1 $p_{t+1}$ 1010 is close to (e.g., matches by more than a threshold amount of pixels) the segmentation map patch $g_{t+1}$ 946, the weights that helped generate the predicted segmentation map t+1 $p_{t+1}$ 1010 can be strengthened in the ECN 870. If the loss function $\mathcal{L}_{total}$ 1020 indicates that the predicted segmentation map t+1 $p_{t+1}$ 1010 is far from (e.g., differs from by more than a threshold amount of pixels) the segmentation map patch $g_{t+1}$ 946, the weights that helped generate the predicted segmentation map t+1 $p_{t+1}$ 1010 can be weakened or removed in the ECN 870. In an illustrative example, the loss function $\mathcal{L}_{total}$ 1020 indicated in Equation 1 (and Equations 2-5), provided above in the discussion of FIG. 5.

Within Equations 1-5 for the loss function $\mathcal{L}_{total}$ 1020, $x_j$ and $x_k$ and denote the j-th and k-th pixels in the predicted segmentation map t+1 $p_{t+1}$ 1010, respectively. Within Equation 1 for the loss function $\mathcal{L}_{total}$ 1020, $\alpha$ and $\beta$ denote respective weights for the different terms in the loss function. In some examples, the weight $\alpha$ is associated with how closely the predicted segmentation map t+1 $p_{t+1}$ 1010 matches the segmentation map patch $g_{t+1}$ 946 (the output in the training data). In some examples, the weight $\beta$ is associated with maintaining smoothness within the predicted segmentation map t+1 $p_{t+1}$ 1010, for example to discourage introducing holes or gaps within regions of the predicted segmentation map t+1 $p_{t+1}$ 1010 or any future segmentation map generated by the ECN 870.

Figure 11:
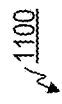
FIG. 11 is a block diagram illustrating an example of an architecture of an error correction network that receives a first frame $i_t$ at time t, a second frame $i_{t+1}$ at time t+1, and a first segmentation map $g_t$ (for the first frame $i_t$ at time t), and that generates second segmentation map $p_{t+1}$ (for the second frame $i_{t+1}$ at time t), in accordance with some examples.

FIG. 11 is a block diagram illustrating an example of an architecture of an error correction network that receives a first frame $i_t$ 1110 at time t, a second frame $i_{t+1}$ 1115 at time t+1, and a first segmentation map $g_t$ 1105 (for the first frame $i_t$ 1110 at time t), and that generates second segmentation map $p_{t+1}$ 1120 (for the second frame $i_{t+1}$ 1115 at time t+1). The first frame $i_t$ 1110 at time t and the second frame $i_{t+1}$ 1115 both have resolutions of HxWx3. The first frame $i_t$ 1110 at time t can be an example of the frame t 820 (e.g., the frame t 825) and/or the image patch $i_t$ 920. The second frame $i_{t+1}$ 1115 at time t+1 can be an example of the frame t+1 860 (e.g., the frame t+1 865) and/or the image patch $i_{t+1}$ 910. The first segmentation map $g_t$ 1105 has a resolution of HxWxC. The first segmentation map $g_t$ 1105 can be an example of the segmentation map patch $g_t$ 940 and/or the segmentation map t of FIG. 8 (e.g., the segmentation map t as generated by the segmentation network 835, without application of the upscaler 845A and/or the ECN 845B, or with application of the upscaler 845A and/or the ECN 845B) (e.g., the segmentation map t 840). The second segmentation map $p_{t+1}$ 1120 also has a resolution of H×W×C, and is an example of the segmentation map t+1 generated by the ECN 870 in FIG. 8 and/or a prediction of the segmentation map patch $g_{t+1}$ 946.

The architecture 1100 of the ECN 870 includes a concatenation, a permutation down (PD) by 4 (PD×4), convolutions (Conv2D), activation functions such as Parametric Rectified Linear Unit (PRELU) functions, additions, a permutation up (PU) by 4 (PU×4), ultimately generating a residual r 1125. The ECN 870 generates downscaled tensor (s) with dimensions H×W×C' along the way to generating the residual r 1125, where C'=(6+C). The ECN 870 calculates the second segmentation map $p_{t+1}$ 1120 by adding the residual r 1125 to the first segmentation map $g_t$ 1105, for instance using the equation $p_{t+1}=g_t+r$. The architecture 1100 of the ECN 870 is illustrated as a U-Net architecture and/or a fully convolutional neural network. In some examples, the architecture 1100 of the ECN 870 can be a different type of neural network (e.g., of any of the types discussed with respect to the neural network 1200) or a different type of machine learning model. The neural network 1200 can be an example of the ECN 870. The ECN 870 can be an example of the neural network 1200.

Figure 12:
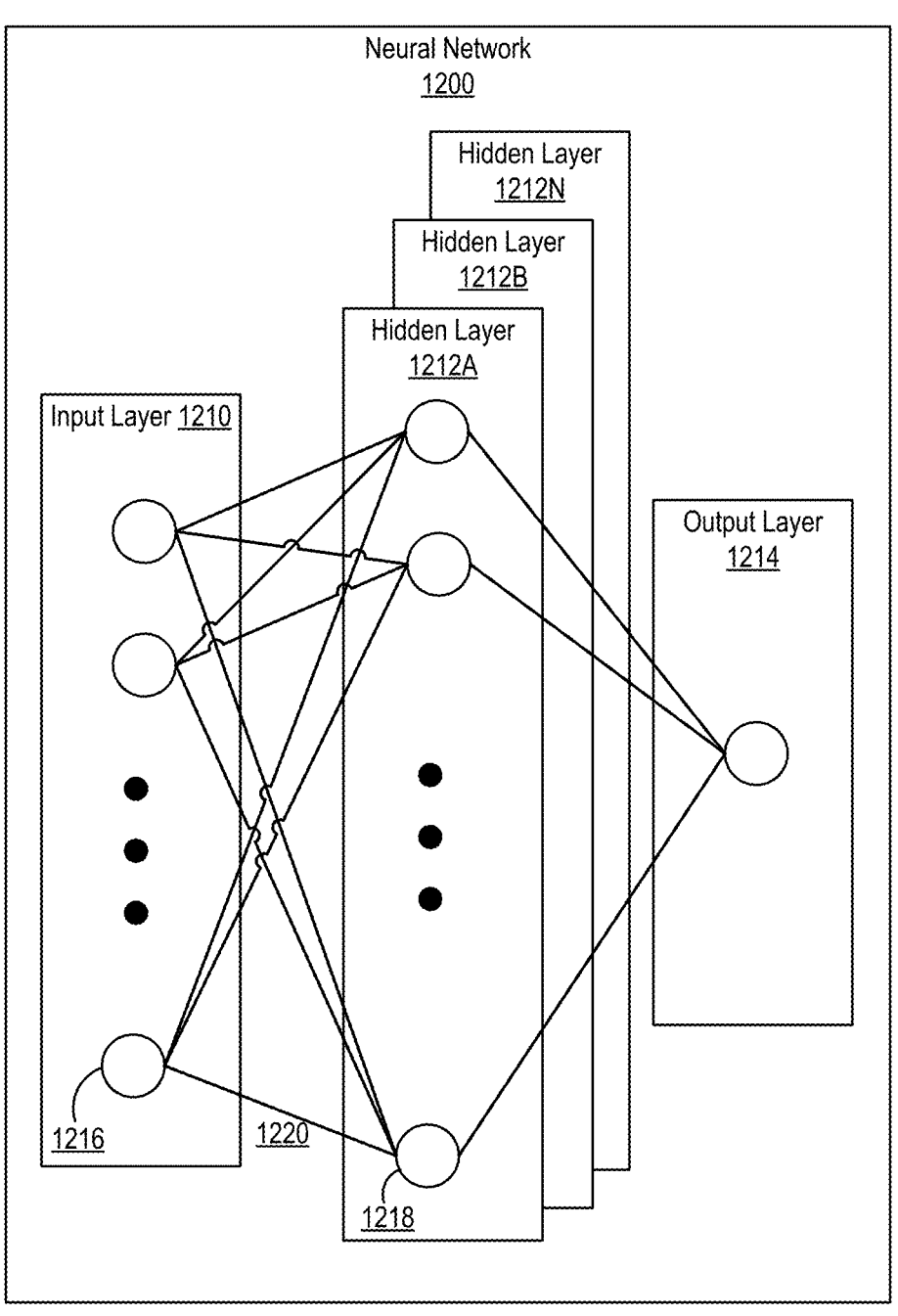
FIG. 12 is a block diagram illustrating an example of a neural network that can be used for imaging operations, in accordance with some examples.

FIG. 12 is a block diagram illustrating an example of a neural network (NN) 1200 that can be used for imaging operations. The neural network 1200 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1200 may be an example of the segmentation network 335, the ECN 345, the segmentation network 412, the architecture 600, the segmentation network 835, the ECN 845B, the ECN 870, the segmentation network 922, the architecture 1100, the segmentation mapper of operation 1505, the trained machine learning model of operation 1510, a neural network or other machine learning model running on the computing system 1600, or a combination thereof. The neural network 1200 may used by various systems discussed herein, such as the image capture and processing system 100, the imaging system 300, the architecture 600, the imaging system 800, the architecture 1100, the head-mounted display (HMD) 1310, the mobile handset 1410, the imaging system that performs the process 1500, the computing system 1600, or a combination thereof.

An input layer 1210 of the neural network 1200 includes input data. The input data of the input layer 1210 can include data representing the pixels of one or more image frames. In some examples, the input data of the input layer 1210 includes data representing pixels of image(s) captured using the image capture and processing system 100, the image 205, the image 320 (or a downscaled variant thereof), the image 325, the image $I^{2x}$ 402, the image patch $i^{2x}$ 410, the image $i^{2x}$ 610, the first image $i^{2x}$ 705, the second image $i^{2x}$ 725, the frame t 820 (or a downscaled variant thereof), the frame t 825, the frame t+1 860, the frame t+1 865, the image I 902, the image patch $i_t$ 920, the image patch $i_{t+1}$ 910, the first frame $i_t$ 1110, the second frame $i_{t+1}$ 1115, image(s) captured by one of the cameras 1330A-1330D, image(s) captured by one of the cameras 1430A-1430D, the image of operation 1505, the image data of operation 1505, image data captured using the input device 1645, image data captured using any other image sensor described herein, any other image data described herein, or a combination thereof. The images can include image data from an image sensor including raw pixel data (including a single color per pixel based, for example, on a Bayer filter) or processed pixel values (e.g., RGB pixels of an RGB image).

The input data of the input layer 1210 can additionally or alternatively include data representing one or more segmentation maps, for instance to use in generating other segmentation maps. Examples of such segmentation maps that can be input as input data to the input layer 1210 can include, for instance the segmentation map 210, the segmentation map 220, the segmentation map generated by the segmentation network 335 of FIG. 3, the segmentation map 340, the segmentation map patch $g^{1x}$ 432, the segmentation map $g^{1x}$ 605, the upscaled segmentation map $\tilde{g}^{2x}$ 710 (or a non-upscaled variant $g^{1x}$ thereof), the upscaled segmentation map $\tilde{g}^{2x}$ 730 (or a non-upscaled variant $g^{1x}$ thereof), the segmentation map t generated by the segmentation network 835 in FIG. 8, the upscaled segmentation map t upscaled using the upscaler 845A, the augmented segmentation map t augmented using the ECN 845B, the segmentation map t 840, the segmentation map patch $g_t$ 940, the segmentation map $g_t$ 1105, the segmentation map generated in operation 1505, another segmentation map herein, or a combination thereof.

The neural network 1200 includes multiple hidden layers 1212, 1212B, through 1212N. The hidden layers 1212, 1212B, through 1212N include "N" number of hidden layers, where "N" is an integer greater than or equal to one. The number of hidden layers can be made to include as many layers as needed for the given application. The neural network 1200 further includes an output layer 1214 that provides an output resulting from the processing performed by the hidden layers 1212, 1212B, through 1212N.

The output layer 1214 can provide output data for an operation performed using the NN 1200. In some examples, the output layer 1214 can provide segmentation maps, augmented segmentation maps, and/or processed image data. For instance, the output layer 1214 can provide the segmentation map 210, the segmentation map 220, the segmentation map 230, the segmentation map generated by the segmentation network 335 of FIG. 3, the segmentation map 340, the augmented segmentation map generated by the ECN 345 in FIG. 3, the augmented segmentation map 350, the processed image 360, the segmentation map $G^{2x}$ 414, the segmentation map patch $g^{1x}$ 432, the segmentation map patch $g^{2x}$ 438, the predicted augmented segmentation map $p^{2x}$ 510, the segmentation map $g^{1x}$ 605, the augmented segmentation map $p^{2x}$ 615, the upscaled segmentation map $g^{2x}$ 710 (or a non-upscaled variant $g^{1x}$ thereof), the upscaled segmentation map $g^{2x}$ 730 (or a non-upscaled variant $g^{1x}$ thereof), augmented segmentation map $p^{2x}$ 715, the augmented segmentation map $p^{2x}$ 735, the ground truth segmentation map $g^{2x}$ 720, the ground truth segmentation map $g^{2x}$ 740, the segmentation map t generated by the segmentation network 835 in FIG. 8, the upscaled segmentation map t upscaled using the upscaler 845A, the augmented segmentation map t augmented using the ECN 845B, the segmentation map t 840, the processed frame t 855, the segmentation map t+1 generated by the ECN 870, the segmentation map t+1 875, the processed frame t 880, the segmentation map G 924, the segmentation map patch $g_t$ 940, the segmentation map patch $g_{t+1}$ 946, the predicted augmented segmentation map $p^{2x}$ 1010, the first segmentation map $g_t$ 1105, the second segmentation map $p_{t+1}$ 1120, the segmentation map generated in operation 1505, the augmented segmentation map generated in operation 1510, the processed image data generated in operation 151, another segmentation map herein, another augmented segmentation map herein, another processed image herein, or a combination thereof.

In some examples, the input layer 1210, the output layer 1214, or one of the hidden layers 1212A-1212N can generate intermediate data used to generate a further output, such as a residual (e.g., residual r 630, residual r 1125).

The neural network 1200 is a multi-layer neural network of interconnected filters. Each filter can be trained to learn a feature representative of the input data. Information associated with the filters is shared among the different layers and each layer retains information as information is processed. In some cases, the neural network 1200 can include a feed-forward network, in which case there are no feedback connections where outputs of the network are fed back into itself. In some cases, the network 1200 can include a recurrent neural network, which can have loops that allow information to be carried across nodes while reading in input.

In some cases, information can be exchanged between the layers through node-to-node (neuron-to-neuron) interconnections (synapses) between the various layers. In some cases, the network can include a convolutional neural network, which may not link every node in one layer to every other node in the next layer. In networks where information is exchanged between layers, nodes of the input layer 1210 can activate a set of nodes in the first hidden layer 1212A. For example, as shown, each of the input nodes of the input layer 1210 can be connected to each of the nodes of the first hidden layer 1212A. The nodes of a hidden layer can transform the information of each input node by applying activation functions (e.g., filters) to this information. The information derived from the transformation can then be passed to and can activate the nodes of the next hidden layer 1212B, which can perform their own designated functions. Example functions include convolutional functions, downscaling, upscaling, data transformation, and/or any other suitable functions. The output of the hidden layer 1212B can then activate nodes of the next hidden layer, and so on. The output of the last hidden layer 1212N can activate one or more nodes of the output layer 1214, which provides a processed output image. In some cases, while nodes (e.g., node 1216, node 1218) in the neural network 1200 are shown as having multiple output lines, a node has a single output and all lines shown as being output from a node represent the same output value.

In some cases, each node or interconnection between nodes can have a weight that is a set of parameters derived from the training of the neural network 1200. For example, an interconnection between nodes can represent a piece of information learned about the interconnected nodes. The interconnection can have a tunable numeric weight that can be tuned (e.g., based on a training dataset), allowing the neural network 1200 to be adaptive to inputs and able to learn as more and more data is processed. For instance, an example weight 1220 is illustrated along the interconnection between node 1216 and node 1218. Other interconnections between other nodes of the neural network 1200 can have different corresponding weights. In some examples, nodes (e.g., node 1216, node 1218) of the neural network 1200 have corresponding biases, or bias offsets, that can also be tuned in the neural network 1200. In some examples, interconnections between nodes of the neural network 1200, such as the interconnection corresponding to the example weight 1220, have corresponding biases, or bias offsets, that can also be tuned in the neural network 1200, for instance during training.

The neural network 1200 is pre-trained to process the features from the data in the input layer 1210 using the different hidden layers 1212, 1212B, through 1212N in order to provide the output through the output layer 1214.

Figure 13A:
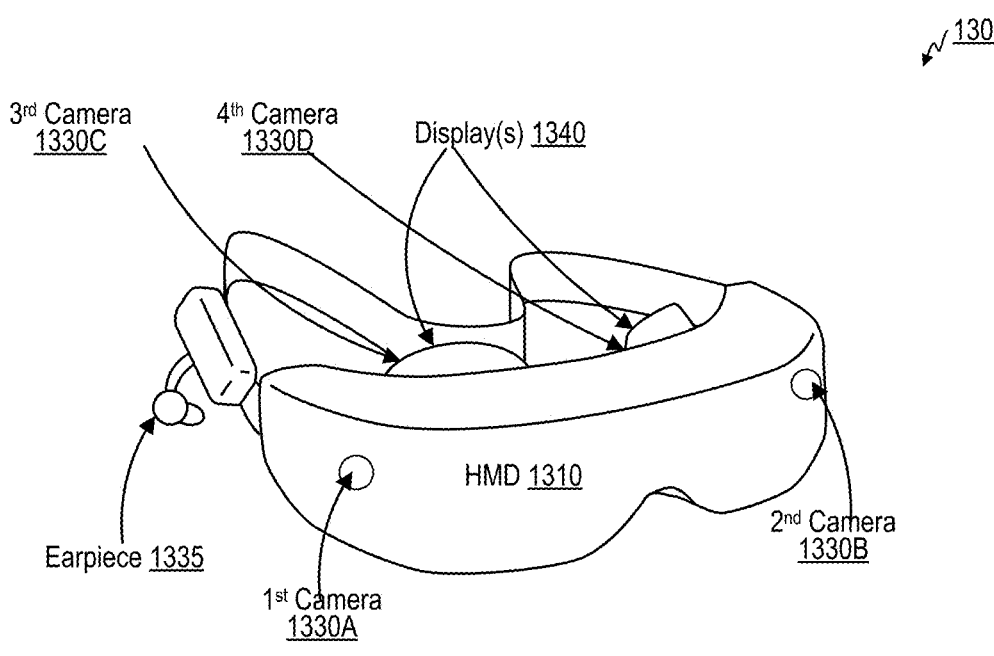
FIG. 13A is a perspective diagram illustrating a head-mounted display (HMD) that is used as part of an imaging system, in accordance with some examples.

FIG. 13A is a perspective diagram 1300 illustrating a head-mounted display (HMD) 1310 that is used as part of a sensor data processing system. The HMD 1310 may be, for example, an augmented reality (AR) headset, a virtual reality (VR) headset, a mixed reality (MR) headset, an extended reality (XR) headset, or some combination thereof. The HMD 1310 includes a first camera 1330A and a second camera 1330B along a front portion of the HMD 1310. The HMD 1310 includes a third camera 1330C and a fourth camera 1330D facing the eye(s) of the user as the eye(s) of the user face the display(s) 1340. In some examples, the HMD 1310 may only have a single camera with a single image sensor. In some examples, the HMD 1310 may include one or more additional cameras in addition to the first camera 1330A, the second camera 1330B, third camera 1330C, and the fourth camera 1330D. In some examples, the HMD 1310 may include one or more additional sensors in addition to the first camera 1330A, the second camera 1330B, third camera 1330C, and the fourth camera 1330D. In some examples, the first camera 1330A, the second camera 1330B, third camera 1330C, and/or the fourth camera 1330D may be examples of the image capture and processing system 100, the image capture device 105A, the image processing device 105B, the image sensor 310, the image sensor 810, or a combination thereof.

The HMD 1310 may include one or more displays 1340 that are visible to a user 1320 wearing the HMD 1310 on the user 1320's head. In some examples, the HMD 1310 may include one display 1340 and two viewfinders. The two viewfinders can include a left viewfinder for the user 1320's left eye and a right viewfinder for the user 1320's right eye. The left viewfinder can be oriented so that the left eye of the user 1320 sees a left side of the display. The right viewfinder can be oriented so that the right eye of the user 1320 sees a right side of the display. In some examples, the HMD 1310 may include two displays 1340, including a left display that displays content to the user 1320's left eye and a right display that displays content to a user 1320's right eye. The one or more displays 1340 of the HMD 1310 can be digital "pass-through" displays or optical "see-through" displays.

Figure 13B:
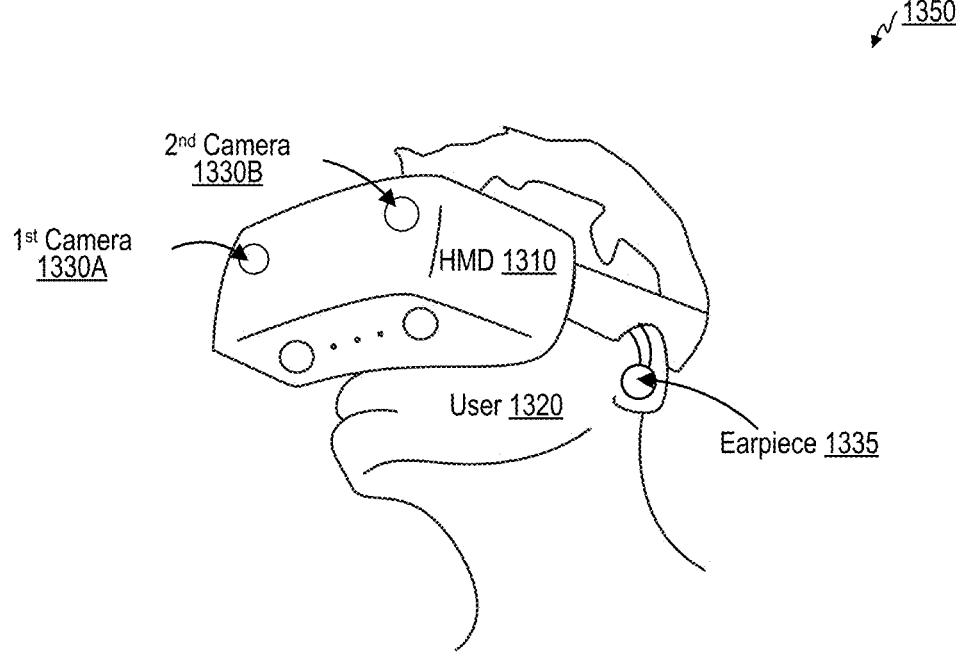
FIG. 13B is a perspective diagram illustrating the head-mounted display (HMD) of FIG. 13A being worn by a user, in accordance with some examples.

The HMD 1310 may include one or more earpieces 1335, which may function as speakers and/or headphones that output audio to one or more ears of a user of the HMD 1310. One earpiece 1335 is illustrated in FIGS. 13A and 13B, but it should be understood that the HMD 1310 can include two earpieces, with one earpiece for each ear (left ear and right ear) of the user. In some examples, the HMD 1310 can also include one or more microphones (not pictured). In some examples, the audio output by the HMD 1310 to the user through the one or more earpieces 1335 may include, or be based on, audio recorded using the one or more microphones.

FIG. 13B is a perspective diagram 1350 illustrating the head-mounted display (HMD) of FIG. 13A being worn by a user 1320. The user 1320 wears the HMD 1310 on the user 1320's head over the user 1320's eyes. The HMD 1310 can capture images with the first camera 1330A and the second camera 1330B. In some examples, the HMD 1310 displays one or more output images toward the user 1320's eyes using the display(s) 1340. In some examples, the output images can include processed image data (e.g., processed image 360, processed frame t 855, processed frame t+1 880). The output images can be based on the images captured by the first camera 1330A and the second camera 1330B (e.g., the image sensor 130, the image sensor 310, the image sensor 810), for example with the processed image data (e.g., processed image 360, processed frame t 855, processed frame t+1 880) overlaid. The output images may provide a stereoscopic view of the environment, in some cases with the processed content overlaid and/or with other modifications. For example, the HMD 1310 can display a first display image to the user 1320's right eye, the first display image based on an image captured by the first camera 1330A. The HMD 1310 can display a second display image to the user 1320's left eye, the second display image based on an image captured by the second camera 1330B. For instance, the HMD 1310 may provide overlaid processed content in the display images overlaid over the images captured by the first camera 1330A and the second camera 1330B. The third camera 1330C and the fourth camera 1330D can capture images of the eyes of the before, during, and/or after the user views the display images displayed by the display(s) 1340. This way, the sensor data from the third camera 1330C and/or the fourth camera 1330D can capture reactions to the processed content by the user's eyes (and/or other portions of the user). An earpiece 1335 of the HMD 1310 is illustrated in an ear of the user 1320. The HMD 1310 may be outputting audio to the user 1320 through the earpiece 1335 and/or through another earpiece (not pictured) of the HMD 1310 that is in the other car (not pictured) of the user 1320.

Figure 14A:
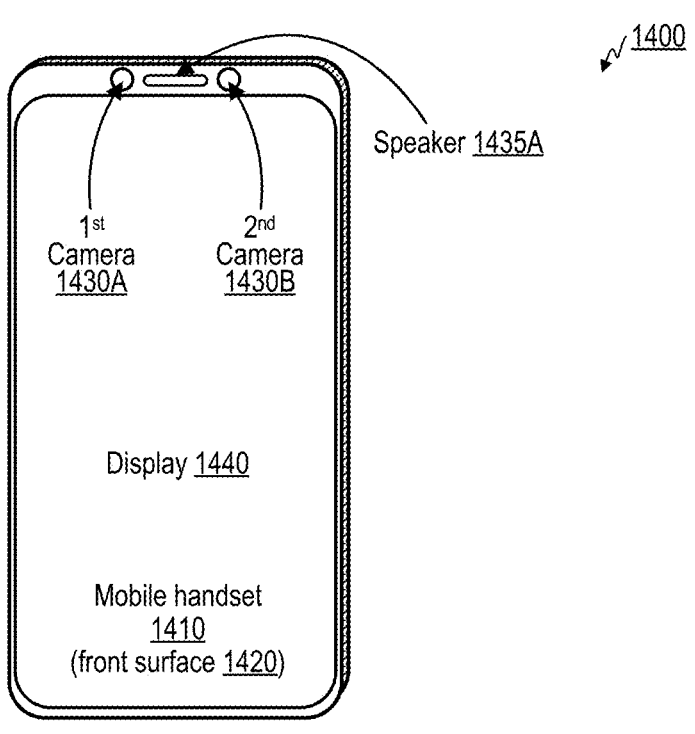
FIG. 14A is a perspective diagram illustrating a front surface of a mobile handset that includes front-facing cameras and that can be used as part of an imaging system, in accordance with some examples.

FIG. 14A is a perspective diagram 1400 illustrating a front surface of a mobile handset 1410 that includes front-facing cameras and can be used as part of a sensor data processing system. The mobile handset 1410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 1420 of the mobile handset 1410 includes a display 1440. The front surface 1420 of the mobile handset 1410 includes a first camera 1430A and a second camera 1430B. The first camera 1430A and the second camera 1430B can face the user, including the eye(s) of the user, while processed image data (e.g., processed image 360, processed frame t 855, processed frame t+1 880) is displayed on the display 1440.

The first camera 1430A and the second camera 1430B are illustrated in a bezel around the display 1440 on the front surface 1420 of the mobile handset 1410. In some examples, the first camera 1430A and the second camera 1430B can be positioned in a notch or cutout that is cut out from the display 1440 on the front surface 1420 of the mobile handset 1410. In some examples, the first camera 1430A and the second camera 1430B can be under-display cameras that are positioned between the display 1440 and the rest of the mobile handset 1410, so that light passes through a portion of the display 1440 before reaching the first camera 1430A and the second camera 1430B. The first camera 1430A and the second camera 1430B of the perspective diagram 1400 are front-facing cameras. The first camera 1430A and the second camera 1430B face a direction perpendicular to a planar surface of the front surface 1420 of the mobile handset 1410. The first camera 1430A and the second camera 1430B may be two of the one or more cameras of the mobile handset 1410. In some examples, the front surface 1420 of the mobile handset 1410 may only have a single camera.

In some examples, the display 1440 of the mobile handset 1410 displays one or more output images toward the user using the mobile handset 1410. In some examples, the output images can include the processed image data (e.g., processed image 360, processed frame t 855, processed frame t+1 880). The output images can be based on the images (e.g., captured by mage sensor 130, image sensor 310, or image sensor 810) captured by the first camera 1430A, the second camera 1430B, the third camera 1430C, and/or the fourth camera 1430D, for example with the processed image data (e.g., processed image 360, processed frame t 855, processed frame t+1 880) overlaid.

In some examples, the front surface 1420 of the mobile handset 1410 may include one or more additional cameras in addition to the first camera 1430A and the second camera 1430B. In some examples, the front surface 1420 of the mobile handset 1410 may include one or more additional sensors in addition to the first camera 1430A and the second camera 1430B. In some cases, the front surface 1420 of the mobile handset 1410 includes more than one display 1440. For example, the one or more displays 1440 can include one or more touchscreen displays.

The mobile handset 1410 may include one or more speakers 1435A and/or other audio output devices (e.g., earphones or headphones or connectors thereto), which can output audio to one or more ears of a user of the mobile handset 1410. One speaker 1435A is illustrated in FIG. 14A, but it should be understood that the mobile handset 1410 can include more than one speaker and/or other audio device. In some examples, the mobile handset 1410 can also include one or more microphones (not pictured). In some examples, the audio output by the mobile handset 1410 to the user through the one or more speakers 1435A and/or other audio output devices may include, or be based on, audio recorded using the one or more microphones.

Figure 14B:
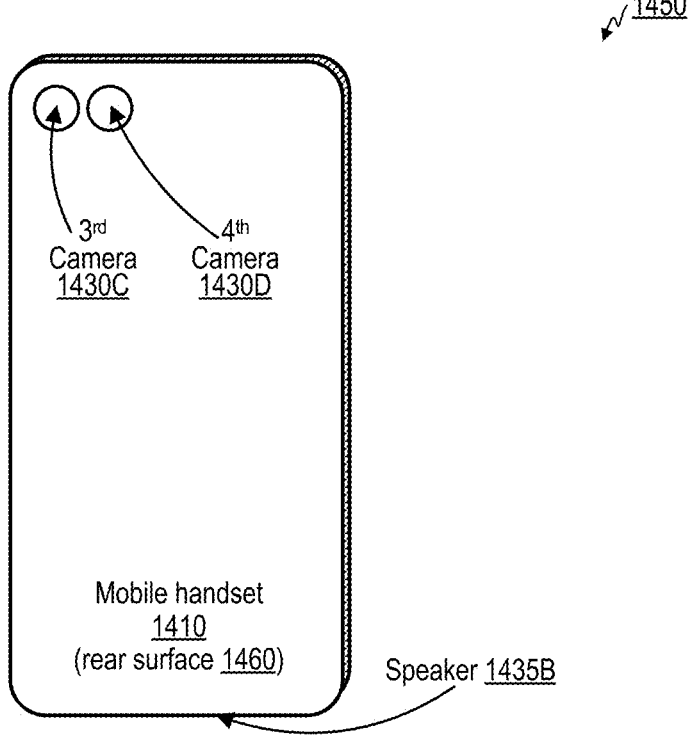
FIG. 14B is a perspective diagram illustrating a rear surface of a mobile handset that includes rear-facing cameras and that can be used as part of an imaging system, in accordance with some examples.

FIG. 14B is a perspective diagram 1450 illustrating a rear surface 1460 of a mobile handset that includes rear-facing cameras and that can be used as part of a sensor data processing system. The mobile handset 1410 includes a third camera 1430C and a fourth camera 1430D on the rear surface 1460 of the mobile handset 1410. The third camera 1430C and the fourth camera 1430D of the perspective diagram 1450 are rear-facing. The third camera 1430C and the fourth camera 1430D face a direction perpendicular to a planar surface of the rear surface 1460 of the mobile handset 1410.

The third camera 1430C and the fourth camera 1430D may be two of the one or more cameras of the mobile handset 1410. In some examples, the rear surface 1460 of the mobile handset 1410 may only have a single camera. In some examples, the rear surface 1460 of the mobile handset 1410 may include one or more additional cameras in addition to the third camera 1430C and the fourth camera 1430D. In some examples, the rear surface 1460 of the mobile handset 1410 may include one or more additional sensors in addition to the third camera 1430C and the fourth camera 1430D. In some examples, the first camera 1430A, the second camera 1430B, third camera 1430C, and/or the fourth camera 1430D may be examples of the image capture and processing system 100, the image capture device 105A, the image processing device 105B, the image sensor 310, the image sensor 810, or a combination thereof.

The mobile handset 1410 may include one or more speakers 1435B and/or other audio output devices (e.g., earphones or headphones or connectors thereto), which can output audio to one or more cars of a user of the mobile handset 1410. One speaker 1435B is illustrated in FIG. 14B, but it should be understood that the mobile handset 1410 can include more than one speaker and/or other audio device. In some examples, the mobile handset 1410 can also include one or more microphones (not pictured). In some examples, the mobile handset 1410 can include one or more microphones along and/or adjacent to the rear surface 1460 of the mobile handset 1410. In some examples, the audio output by the mobile handset 1410 to the user through the one or more speakers 1435B and/or other audio output devices may include, or be based on, audio recorded using the one or more microphones.

The mobile handset 1410 may use the display 1440 on the front surface 1420 as a pass-through display. For instance, the display 1440 may display output images, such as processed image data (e.g., processed image 360, processed frame t 855, processed frame t+1 880). The output images can be based on the images (e.g. from the image sensor 130, the image sensor 310, or the image sensor 810) captured by the third camera 1430C and/or the fourth camera 1430D, for example with the processed image data (e.g., processed image 360, processed frame t 855, processed frame t+1 880) overlaid. The first camera 1430A and/or the second camera 1430B can capture images of the user's eyes (and/or other portions of the user) before, during, and/or after the display of the output images with the processed content on the display 1440. This way, the sensor data from the first camera 1430A and/or the second camera 1430B can capture reactions to the processed content by the user's eyes (and/or other portions of the user).

FIG. 15 is a flow diagram illustrating a process 1500 for imaging. The process 1500 may be performed by an imaging system. In some examples, the imaging system can include, for example, the image capture and processing system 100, the image capture device 105A, the image processing device 105B, the image processor 150, the ISP 154, the host processor 152, the imaging system 300, the image sensor 310, the ISP 315, the downscaler 330, the segmentation network 335, the ECN 345, the application processor 355, the segmentation network 412, the architecture 600, the imaging system 800, the image sensor 810, the ISP 815, the downscaler 830, the segmentation network 835, the upscaler 845A, the ECN 845B, the application processor 850, the ECN 870, the architecture 1100, the neural network 1200, the HMD 1310, the mobile handset 1410, the computing system 1600, the processor 1610, an apparatus, a system, a non-transitory computer-readable medium coupled to a processor, or a combination thereof.

At operation 1505, the imaging system (or at least one subsystem thereof) is configured to, and can, generate a segmentation map of an image by processing image data associated with the image using a segmentation mapper. Different object types in the image are categorized into different regions in the segmentation map.

In some examples, the imaging system (or at least one subsystem thereof) is configured to, and can, receive the image, for instance from an image sensor that captured the image. Examples of the image include an image of the scene 110 captured using the image capture and processing system 100, the image 205, the image 320 (or a downscaled variant thereof), the image 325, the image $I^{2x}$ 402, the image patch $i^{2x}$ 410, the image $i^{2x}$ 610, the first image $i^{2x}$ 705, the second image $i^{2x}$ 725, the frame t 820 (or a downscaled variant thereof), the frame t 825, the frame t+1 860, the frame t+1 865, the image I 902, the image patch $i_t$ 920, the image patch $i_{t+1}$ 910, the first frame $i_t$ 1110, the second frame $i_{t+1}$ 1115, an image used as input data for the input layer 1210 of the NN 1200, an image captured using any of the cameras 1330A-1330D of the HMD 1310, an image captured using any of the cameras 1430A-1430D of the mobile handset

1410, an image captured using an image sensor of the input device 1645, or a combination thereof. Examples of the image sensor include image sensor 130, the image sensor 310, the image sensor 810, the first camera 1330A, the second camera 1330B, the third camera 1330C, the fourth camera 1330D, the first camera 1430A, the second camera 1430B, the third camera 1430C, the fourth camera 1430D, the input device 1645, an image sensor that captures any of the images previously listed as examples of the image, another sensor described herein, or a combination thereof.

Examples of the segmentation mapper include the segmentation network 335, the segmentation network 412, the segmentation network 835, the segmentation network 922, the NN 1200, another segmentation network or segmentation mapper discussed herein, or a combination thereof.

At operation 1510, the imaging system (or at least one subsystem thereof) is configured to, and can, generate an augmented segmentation map by processing at least the segmentation map using a segmentation map error correction engine.

Examples of the segmentation map error correction engine include the ECN 345, the architecture 600, the ECN 845B, the ECN 870, the architecture 1100, the NN 1200, another error correction network discussed herein, another machine learning model discussed herein, or a combination thereof.

In some aspects, the image data associated with the image includes a downscaled variant of the image, and the augmented segmentation map is upscaled relative to the segmentation map. For instance, the image can be downscaled using a downscaler (e.g., downscaler 330, downscaler 830) to generate the image data. The upscaling can be performed using an upscaler (e.g., upscaler 845A) or the segmentation map error correction engine (e.g., the ECN 345, the architecture 600, the ECN 845B, the ECN 870, the architecture 1100, the NN 1200, another error correction network discussed herein, another machine learning model discussed herein, or a combination thereof).

In some aspects, the processing of at least the segmentation map using the segmentation map error correction engine (as in operation 1510) includes processing the image data and the segmentation map using the segmentation map error correction engine. For instance, in reference to FIG. 3, the image 320 or the image 325 can be examples of the image or the image data, the segmentation map generated by the segmentation network 335 or the segmentation map 340 can be examples of the segmentation map, the ECN 345 can be an example of the segmentation map error correction engine, and the augmented segmentation map generated by the ECN 345 or the augmented segmentation map 350 can be examples of the augmented segmentation map. In reference to FIG. 5, the image patch $i^{2x}$ 410 can be an example of the image data, the segmentation map patch $g^{1x}$ 432 can be an example of the segmentation map, the ECN 345 can be an example of the segmentation map error correction engine, and the predicted augmented segmentation map $p^{2x}$ 510 or the segmentation map patch $g^{2x}$ 438 can be examples of the augmented segmentation map. In reference to FIG. 6, the image $i^{2x}$ 610 can be an example of the image or the image data, the segmentation map $g^{1x}$ 605 can be an example of the segmentation map, the architecture 600 can be an example of the segmentation map error correction engine, and the augmented segmentation map $p^{2x}$ 615 can be an example of the augmented segmentation map. In reference to FIG. 8, the frame t 820 or the frame t 825 or the frame t+1 860 or the frame t+1 865 can be examples of the image or the image data, the segmentation map generated by the segmentation network 835 or the segmentation map t 840 can be examples of the segmentation map, the ECN 870 can be an example of the segmentation map error correction engine, and the segmentation map t+1 generated by the ECN 870 or the segmentation map t+1 875 can be examples of the augmented segmentation map. In reference to FIG. 10, the image patch i$_t$ 920 or the image patch i$_{t+1}$ 910 can be examples of the image data, the segmentation map patch g$_t$ 940 can be an example of the segmentation map, the ECN 870 can be an example of the segmentation map error correction engine, and the predicted segmentation map t+1 p$_{t+1}$ 1010 or the segmentation map patch g$_{t+1}$ 946 can be examples of the augmented segmentation map. In reference to FIG. 11, the first frame i$_t$ 1110 or the second frame i$_{t+1}$ 1115 can be examples of the image data, the first segmentation map g$_t$ 1105 can be an example of the segmentation map, the architecture 1100 can be an example of the segmentation map error correction engine, and the second segmentation map p$_{t+1}$ 1120 can be an example of the augmented segmentation map.

In some aspects, the image is a frame of a video, for instance as illustrated and discussed in reference to FIGS. 8-11. For instance, the frame t 820, the frame t 825, the frame t+1 860, the frame t+1 865, the image patch i$_t$ 920, or the image patch i$_{t+1}$ 910 can be examples of the image and/or the image data. In some aspects, the imaging system (or at least one subsystem thereof) is configured to, and can, generate an augmented second segmentation map associated with a second frame of the video by processing the image data, the segmentation map, and secondary image data associated with a second frame of the video using the segmentation map error correction engine. The imaging system can generate a processed second frame of the video by processing the second frame of the video using the augmented second segmentation map. For instance, in reference to FIG. 8, the frame t 820 or the frame t 825 can be examples of the frame of the video, the frame t+1 860 or the frame t+1 865 can be examples of the second frame, the segmentation map generated by the segmentation network 835 or the segmentation map t 840 can be examples of the segmentation map, the ECN 870 can be an example of the segmentation map error correction engine, and the segmentation map t+1 generated by the ECN 870 or the segmentation map t+1 875 can be examples of the augmented second segmentation map. In reference to FIG. 10, the image patch i$_t$ 920 can be an example of the frame, the image patch i$_{t+1}$ 910 can be an example of the second frame, the segmentation map patch g$_t$ 940 can be an example of the segmentation map, the ECN 870 can be an example of the segmentation map error correction engine, and the predicted segmentation map t+1 p$_{t+1}$ 1010 or the segmentation map patch g$_{t+1}$ 946 can be examples of the augmented second segmentation map. In reference to FIG. 11, the first frame i$_t$ 1110 can be an example of the frame, the second frame i$_{t+1}$ 1115 can be an example of the second frame, the first segmentation map g$_t$ 1105 can be an example of the segmentation map, the architecture 1100 can be an example of the segmentation map error correction engine, and the second segmentation map p$_{t+1}$ 1120 can be an example of the augmented second segmentation map.

In some examples, the processing of at least the segmentation map using the segmentation map error correction engine (as in operation 1510) includes processing at least the frame of the video, the segmentation map, and a subsequent frame of the video using the segmentation map error correction engine. The augmented segmentation map is associated with the subsequent frame of the video. For instance, in reference to FIG. 8, the frame t 820 or the frame t 825 can be examples of the frame of the video, the frame t+1 860 or the frame t+1 865 can be examples of the subsequent frame, the segmentation map generated by the segmentation network 835 or the segmentation map t 840 can be examples of the segmentation map, the ECN 870 can be an example of the segmentation map error correction engine, and the segmentation map t+1 generated by the ECN 870 or the segmentation map t+1 875 can be examples of the augmented segmentation map. In reference to FIG. 10, the image patch i$_t$ 920 can be an example of the frame, the image patch i$_{t+1}$ 910 can be an example of the subsequent frame, the segmentation map patch g$_t$ 940 can be an example of the segmentation map, the ECN 870 can be an example of the segmentation map error correction engine, and the predicted segmentation map t+1 p$_{t+1}$ 1010 or the segmentation map patch g$_{t+1}$ 946 can be examples of the augmented segmentation map. In reference to FIG. 11, the first frame i$_t$ 1110 can be an example of the frame, the second frame i$_{t+1}$ 1115 can be an example of the subsequent frame, the first segmentation map g$_t$ 1105 can be an example of the segmentation map, the architecture 1100 can be an example of the segmentation map error correction engine, and the second segmentation map p$_{t+1}$ 1120 can be an example of the augmented segmentation map.

In some aspects, an edge in the image aligns more closely to a corresponding edge in the augmented segmentation map than to a corresponding edge in the segmentation map. For instance, the augmented segmentation map may more accurately align to the image than the segmentation map. For instance, the edges of the person's face and facial features in the augmented segmentation map 350 more closely align to the edges of the person's face and facial features in the image 325 than the edges of the person's face and facial features in the segmentation map 340 do. Similarly, the edges of the person's hand in the augmented segmentation map p$^{2x}$ 715 more closely align to the edges of the person's hand in the first image i$^{2x}$ 705 than the edges of the person's hand in the upscaled segmentation map g$^{2x}$ 710 do. Similarly, the edges of the person's hand in the augmented segmentation map p$^{2x}$ 735 more closely align to the edges of the person's hand in the second image i$^{2x}$ 725 than the edges of the person's hand in the upscaled segmentation map g̃$^{2x}$ 730 do.

At operation 1515, the imaging system (or at least one subsystem thereof) is configured to, and can, generate processed image data by processing the image using the augmented segmentation map.

Examples of the processed image data include the processed image 360, the processed frame t 855, the processed frame t+1 880, another processed image or frame discussed herein, or a combination thereof.

In some aspects, the segmentation map error correction engine includes a trained machine learning model. In some aspects, processing at least the segmentation map using the segmentation map error correction engine (as in operation 1510) includes inputting at least the segmentation map into the trained machine learning model to process at least the segmentation map using the trained machine learning model. For instance, the segmentation map error correction engine can include the architecture 600, the architecture 1100, the neural network 1200, any other machine learning model or architecture discussed herein, or a combination thereof. In some aspects, the trained machine learning model learns, and/or is trained (e.g., by the imaging system), based on training data. In some aspects, the training data can include an image (e.g., the image I$^{2x}$ 402, the image patch i$^{2x}$

410, the image I 902, the image patch $i_{r+1}$ 910, and/or the image patch $i_r$ 920), a first segmentation map generated using the image with one or more image processing operations applied (e.g., segmentation map patch $g^{1x}$ 432 and/or segmentation map patch $g_r$ 940), and a second segmentation map generated using the image without the one or more image processing operations applied (e.g., segmentation map patch $g^{2x}$ 438 and/or segmentation map patch $g_{r+1}$ 946). In some aspects, the one or more image processing operations include at least one of a resampling filter (e.g., bicubic downscaling 416, randomized scaling 420, randomized scaling 928), a blur filter, logit degradation (e.g., degradation 424, degradation 932), a perspective transform (e.g., perspective transform 426, perspective transform 934), a flip (e.g., flipping and/or rotation 418, flipping and/or rotation 926), a rotation (e.g., flipping and/or rotation 418, flipping and/or rotation 926), a shift (e.g., random shift 428, random shift 936), a crop (e.g., random cropping 430, random cropping 938), another image processing operation discussed herein, or a combination thereof. In some aspects, the trained machine learning model is an error correction network (ECN) (e.g., the ECN 345, the ECN 845B, the ECN 870). In some aspects, the imaging system (or at least one subsystem thereof) is configured to, and can, update the trained machine learning model based on at least the image data, the segmentation map, the augmented segmentation map, the processed image data, or a combination thereof.

In some aspects, the processing of the image using the augmented segmentation map (as in operation 1515) includes processing different regions of the image using to different processing settings according to the augmented segmentation map. The different regions of the image are based on different regions of the augmented segmentation map. For instance, regions of the image that depict skin (according to the augmented segmentation map) can be processed with a processing setting corresponding to skin, regions of the image that depict hair (according to the augmented segmentation map) can be processed with a processing setting corresponding to hair, regions of the image that depict plants (according to the augmented segmentation map) can be processed with a processing setting corresponding to plants, regions of the image that depict sky (according to the augmented segmentation map) can be processed with a processing setting corresponding to sky, regions of the image that depict stone (according to the augmented segmentation map) can be processed with a processing setting corresponding to stone, regions of the image that depict cloth (according to the augmented segmentation map) can be processed with a processing setting corresponding to cloth, regions of the image that depict metal (according to the augmented segmentation map) can be processed with a processing setting corresponding to metal, regions of the image that depict glass (according to the augmented segmentation map) can be processed with a processing setting corresponding to glass, and so forth. In some aspects, the different processing settings indicate different strengths at which to apply a specified image processing function to at least one pixel of the image. For instance, the specified image processing function can include noise reduction, sharpness increase, sharpness decrease, brightness increase, brightness decrease, tone mapping, saturation increase, saturation decrease, contrast increase, contrast decrease, another image processing operation discussed herein, or a combination thereof. In an illustrative example, the specified image processing function (e.g., noise reduction) can be applied at a first strength to regions of the image that depict skin (according to the augmented segmentation map), and can be applied at a second strength to regions of the image that depict cloth (according to the augmented segmentation map).

In some aspects, the imaging system (or at least one subsystem thereof) is configured to, and can, output the processed image data (e.g., using the output device 1635 and/or the communication interface 1640). In some aspects, the imaging system (or at least one subsystem thereof) is configured to, and can, display the processed image data, and/or cause display of the processed image data, using a display (e.g., that is part of the output device 1635). In some aspects, the imaging system (or at least one subsystem thereof) is configured to, and can, send the processed image data, and/or cause the processed image data to be sent, to a recipient device using a communication transceiver (e.g., that is part of the output device 1635, and/or the communication interface 1640).

In some examples, the processes described herein (e.g., the respective processes of FIGS. 1, 2, 3, 4, 5, 6, 7, 8, 9, 10, 11, 12, 13, 14, the process 1500 of FIG. 15, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 300, the image sensor 310, the ISP 315, the downscaler 330, the segmentation network 335, the ECN 345, the application processor 355, the segmentation network 412, the architecture 600, the imaging system 800, the image sensor 810, the ISP 815, the downscaler 830, the segmentation network 835, the upscaler 845A, the ECN 845B, the application processor 850, the ECN 870, the architecture 1100, the neural network 1200, the HMD 1310, the mobile handset 1410, the imaging system that performs the process 1500, the computing system 1600, the processor 1610, an apparatus, a system, a non-transitory computer-readable medium coupled to a processor, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 16:
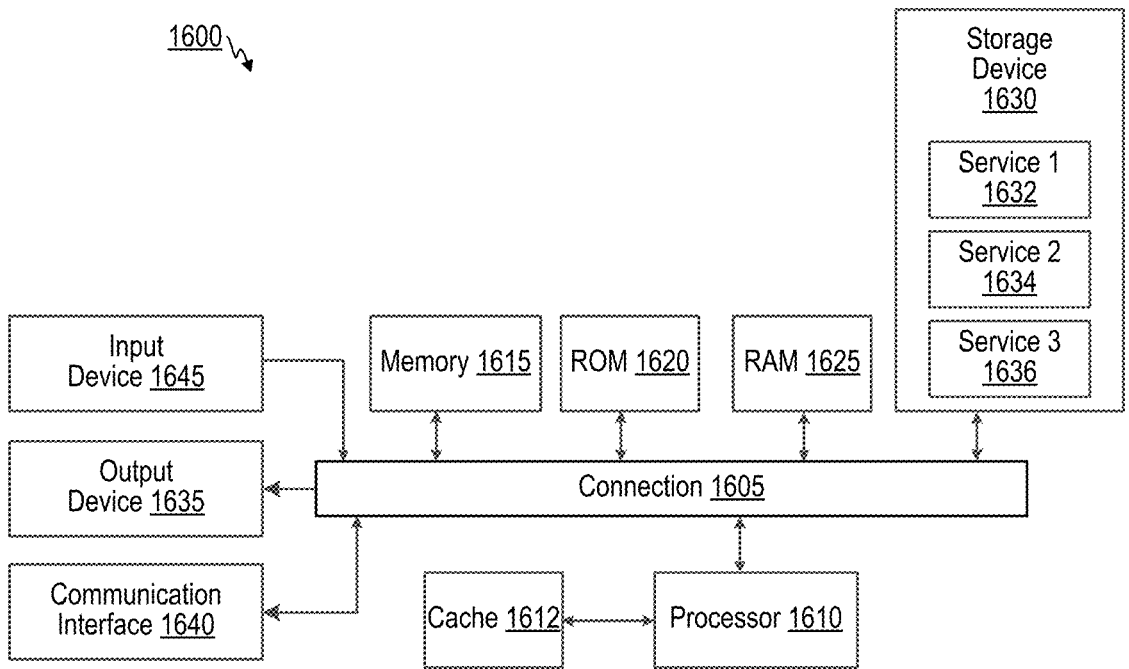
FIG. 16 is a diagram illustrating an example of a computing system for implementing certain aspects described herein.

FIG. 16 is a diagram illustrating an example of a system for implementing certain aspects of the present technology. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some aspects, computing system 1600 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1600 includes at least one processing unit (CPU or processor) 1610 and connection 1605 that couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms. In some instances, multimodal systems can enable a user to provide multiple types of input/output to communicate with computing system 1600. Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1602.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some aspects, a hardware service that performs a particular function can include the software component stored in a computer-readable medium in connection with the necessary hardware components, such as processor 1610, connection 1605, output device 1635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Disclosure Include:

Aspect 1. An apparatus for error correction, the apparatus comprising: at least one memory; and at least one processor coupled to the at least one memory and configured to: generate a segmentation map of an image by processing image data associated with the image using a segmentation mapper, wherein different object types in the image are categorized into different regions in the segmentation map; generate an augmented segmentation map by processing at least the segmentation map using a segmentation map error correction engine; and generate processed image data by processing the image using the augmented segmentation map.

Aspect 2. The apparatus of Aspect 1, wherein the image data associated with the image includes a downscaled variant of the image, wherein the augmented segmentation map is upscaled relative to the segmentation map.

Aspect 3. The apparatus of any of Aspects 1 to 2, wherein, to process at least the segmentation map using the segmentation map error correction engine, the at least one processor is configured to: process the image data and the segmentation map using the segmentation map error correction engine.

Aspect 4. The apparatus of any of Aspects 1 to 3, wherein the image is a frame of a video.

Aspect 5. The apparatus of Aspect 4, wherein the at least one processor is configured to: generate an augmented second segmentation map associated with a second frame of the video by processing the image data, the segmentation map, and secondary image data associated with a second frame of the video using the segmentation map error correction engine; and generate a processed second frame of the video by processing the second frame of the video using the augmented second segmentation map.

Aspect 6. The apparatus of any of Aspects 4 to 5, wherein, to process at least the segmentation map using the segmentation map error correction engine, the at least one processor is configured to: process at least the frame of the video, the segmentation map, and a subsequent frame of the video using the segmentation map error correction engine, wherein the augmented segmentation map is associated with the subsequent frame of the video.

Aspect 7. The apparatus of any of Aspects 1 to 6, wherein the segmentation map error correction engine includes a trained machine learning model, and wherein, to process at least the segmentation map using the segmentation map error correction engine, the at least one processor is configured to input at least the segmentation map into the trained machine learning model to process at least the segmentation map using the trained machine learning model.

Aspect 8. The apparatus of Aspect 7, the trained machine learning model having been trained based on training data, the training data including an image, a first segmentation map generated using the image with one or more image processing operations applied, and a second segmentation map generated using the image without the one or more image processing operations applied.

Aspect 9. The apparatus of Aspect 8, wherein the one or more image processing operations include at least one of a resampling filter, a blur filter, logit degradation, a perspective transform, a flip, a rotation, a shift, or a crop.

Aspect 10. The apparatus of any of Aspects 7 to 9, wherein the trained machine learning model is an error correction network (ECN).

Aspect 11. The apparatus of any of Aspects 7 to 10, wherein the at least one processor is configured to: update the trained machine learning model based on at least the image data, the segmentation map, and the augmented segmentation map.

Aspect 12. The apparatus of any of Aspects 1 to 11, wherein, to process the image using the augmented segmentation map, the at least one processor is configured to: process different regions of the image using to different processing settings according to the augmented segmentation map, wherein the different regions of the image are based on different regions of the augmented segmentation map.

Aspect 13. The apparatus of Aspect 12, wherein the different processing settings indicate different strengths at which to apply a specified image processing function to at least one pixel of the image.

Aspect 14. The apparatus of any of Aspects 1 to 13, wherein an edge in the image aligns more closely to a corresponding edge in the augmented segmentation map than to a corresponding edge in the segmentation map.

Aspect 15. The apparatus of any of Aspects 1 to 14, wherein the at least one processor is configured to: output the processed image data.

Aspect 16. The apparatus of any of Aspects 1 to 15, wherein the at least one processor is configured to: display the processed image data.

Aspect 17. The apparatus of any of Aspects 1 to 16, wherein the at least one processor is configured to: transmit the processed image data to a recipient device.

Aspect 18. The apparatus of any of Aspects 1 to 17, wherein the apparatus includes at least one of a head-mounted display (HMD), a mobile handset, or a wireless communication device.

Aspect 19. A method of error correction, the method comprising: generating a segmentation map of an image by processing image data associated with the image using a segmentation mapper, wherein different object types in the image are categorized into different regions in the segmentation map; generating an augmented segmentation map by processing at least the segmentation map using a segmentation map error correction engine; and generating processed image data by processing the image using the augmented segmentation map.

Aspect 20. The method of Aspect 19, wherein the image data associated with the image includes a downscaled variant of the image, wherein the augmented segmentation map is upscaled relative to the segmentation map.

Aspect 21. The method of any of Aspects 19 to 20, wherein processing at least the segmentation map using the segmentation map error correction engine includes processing the image data and the segmentation map using the segmentation map error correction engine.

Aspect 22. The method of any of Aspects 19 to 21, wherein the image is a frame of a video.

Aspect 23. The method of Aspect 22, further comprising: generating an augmented second segmentation map associated with a second frame of the video by processing the image data, the segmentation map, and secondary image data associated with a second frame of the video using the segmentation map error correction engine; and generating a processed second frame of the video by processing the second frame of the video using the augmented second segmentation map.

Aspect 24. The method of any of Aspects 22 to 23, wherein processing at least the segmentation map using the segmentation map error correction engine includes processing at least the frame of the video, the segmentation map, and a subsequent frame of the video using the segmentation map error correction engine, wherein the augmented segmentation map is associated with the subsequent frame of the video.

Aspect 25. The method of any of Aspects 19 to 24, wherein the segmentation map error correction engine includes a trained machine learning model, and wherein processing at least the segmentation map using the segmentation map error correction engine includes inputting at least the segmentation map into the trained machine learning model to process at least the segmentation map using the trained machine learning model.

Aspect 26. The method of Aspect 25, the trained machine learning model having been trained based on training data, the training data including an image, a first segmentation map generated using the image with one or more image processing operations applied, and a second segmentation map generated using the image without the one or more image processing operations applied.

Aspect 27. The method of Aspect 26, wherein the one or more image processing operations include at least one of a resampling filter, a blur filter, logit degradation, a perspective transform, a flip, a rotation, a shift, or a crop.

Aspect 28. The method of any of Aspects 25 to 27, wherein the trained machine learning model is an error correction network (ECN).

Aspect 29. The method of any of Aspects 25 to 28, further comprising: updating the trained machine learning model based on at least the image data, the segmentation map, and the augmented segmentation map.

Aspect 30. The method of any of Aspects 19 to 29, wherein processing the image using the augmented segmentation map includes processing different regions of the image using to different processing settings according to the augmented segmentation map, wherein the different regions of the image are based on different regions of the augmented segmentation map.

Aspect 31. The method of Aspect 30, wherein the different processing settings indicate different strengths at which to apply a specified image processing function to at least one pixel of the image.

Aspect 32. The method of any of Aspects 19 to 31, wherein an edge in the image aligns more closely to a corresponding edge in the augmented segmentation map than to a corresponding edge in the segmentation map.

Aspect 33. The method of any of Aspects 19 to 32, further comprising: outputting the processed image data.

Aspect 34. The method of any of Aspects 19 to 33, further comprising: displaying the processed image data.

Aspect 35. The method of any of Aspects 19 to 34, further comprising: transmitting the processed image data to a recipient device.

Aspect 36. A non-transitory computer-readable medium having stored thereon instructions that, when executed by one or more processors, cause the one or more processors to perform operations according to any of Aspects 1 to 35.

Aspect 37. An apparatus for sensor data processing, the apparatus comprising one or more means for performing operations according to any of Aspects 1 to 35.

What is claimed is:

1. An apparatus for error correction, the apparatus comprising:

at least one memory; and at least one processor coupled to the at least one memory and configured to:

generate a segmentation map of a first video frame of a video by processing image data associated with the first video frame using a segmentation mapper, wherein different object types in the first video frame are categorized into different regions in the segmentation map;

generate an augmented segmentation map by processing at least the segmentation map and a second video frame of the video using a segmentation map error correction engine;

generate processed image data by processing the first video frame using the augmented segmentation map; and output a processed variant of the video that includes the processed image data.

2. The apparatus of claim 1, wherein the image data associated with the first video frame includes a downscaled variant of the first video frame, wherein the augmented segmentation map is upscaled relative to the segmentation map.

3. The apparatus of claim 1, wherein, to process at least the segmentation map and the second video frame using the segmentation map error correction engine, the at least one processor is configured to:

process the image data, the segmentation map, and the second video frame using the segmentation map error correction engine.

4. The apparatus of claim 1, wherein the image is a second video frame is temporally adjacent to the first video frame within the video.

5. The apparatus of claim 1, wherein the at least one processor is configured to:

generate an augmented second segmentation map associated with the second video frame of the video by processing at least the image data, the segmentation map, and secondary image data associated with a second frame of the video using the segmentation map error correction engine; and generate a processed second video frame of the video by processing the second video frame of the video using the augmented second segmentation map, wherein the processed variant of the video includes the processed second video frame.

6. The apparatus of claim 1, wherein the augmented segmentation map includes information that is based on the second video frame of the video.

7. The apparatus of claim 1, wherein the segmentation map error correction engine includes a trained machine learning model, and wherein, to process at least the segmentation map using the segmentation map error correction engine, the at least one processor is configured to input at least the segmentation map and the second video frame into the trained machine learning model to process at least the segmentation map and the second video frame using the trained machine learning model.

8. The apparatus of claim 7, the trained machine learning model having been trained based on training data, the training data including an image, a first segmentation map generated using the image with one or more image processing operations applied, and a second segmentation map generated using the image without the one or more image processing operations applied.

9. The apparatus of claim 8, wherein the one or more image processing operations include at least one of a resampling filter, a blur filter, logit degradation, a perspective transform, a flip, a rotation, a shift, or a crop.

10. The apparatus of claim 7, wherein the trained machine learning model is an error correction network (ECN).

11. The apparatus of claim 7, wherein the at least one processor is configured to:

update the trained machine learning model based on at least the image data, the segmentation map, and the augmented segmentation map.

12. The apparatus of claim 1, wherein, to process the first video frame using the augmented segmentation map, the at least one processor is configured to:

process different regions of the first video frame using to different processing settings according to the augmented segmentation map, wherein the different regions of the first video frame are based on different regions of the augmented segmentation map.

13. The apparatus of claim 12, wherein the different processing settings indicate different strengths at which to apply a specified image processing function to the different regions of the first video frame.

14. The apparatus of claim 1, wherein an edge in the first video frame aligns more closely to a first corresponding edge in the augmented segmentation map than to a second corresponding edge in the segmentation map.

15. The apparatus of claim 1, wherein, to output the processed variant of the video, the at least one processor is configured to:

output the processed image data.

16. The apparatus of claim 1, wherein, to output the processed variant of the video, the at least one processor is configured to:

display the processed image data.

17. The apparatus of claim 1, wherein, to output the processed variant of the video, the at least one processor is configured to:

transmit the processed image data to a recipient device.

18. The apparatus of claim 1, wherein the apparatus includes at least one of a head-mounted display (HMD), a mobile handset, or a wireless communication device.

19. A method of error correction, the method comprising:

generating a segmentation map of a first video frame of a video by processing image data associated with the first video frame using a segmentation mapper, wherein different object types in the first video frame are categorized into different regions in the segmentation map;

generating an augmented segmentation map by processing at least the segmentation map and a second video frame of the video using a segmentation map error correction engine;

generating processed image data by processing the first video frame using the augmented segmentation map; and output a processed variant of the video that includes the processed image data.

20. The method of claim 19, wherein the image data associated with the first video frame includes a downscaled variant of the first video frame, wherein the augmented segmentation map is upscaled relative to the segmentation map.

21. The method of claim 19, wherein processing at least the segmentation map and the second video frame using the segmentation map error correction engine includes processing the image data, the segmentation map, and the second video frame using the segmentation map error correction engine.

22. The method of claim 19, wherein the second video frame is temporally adjacent to the first video frame within the video.

23. The method of claim 19, further comprising:

generating an augmented second segmentation map associated with the second video frame of the video by processing at least the image data, the segmentation map, and secondary image data associated with a second frame of the video using the segmentation map error correction engine; and generating a processed second video frame of the video by processing the second video frame of the video using the augmented second segmentation map, wherein the processed variant of the video includes the processed second video frame.

24. The method of claim 19, wherein the augmented segmentation map includes information that is based on the second video frame of the video.

25. The method of claim 19, wherein the segmentation map error correction engine includes a trained machine learning model, and wherein processing at least the segmentation map using the segmentation map error correction engine includes inputting at least the segmentation map and the second video frame into the trained machine learning model to process at least the segmentation map and the second video frame using the trained machine learning model.

26. The method of claim 25, the trained machine learning model having been trained based on training data, the training data including an image, a first segmentation map generated using the image with one or more image processing operations applied, and a second segmentation map generated using the image without the one or more image processing operations applied.

27. The method of claim 25, further comprising:

updating the trained machine learning model based on at least the image data, the segmentation map, and the augmented segmentation map.

28. The method of claim 19, wherein processing the first video frame using the augmented segmentation map includes processing different regions of the first video frame using to different processing settings according to the augmented segmentation map, wherein the different regions of the first video frame are based on different regions of the augmented segmentation map.

29. The method of claim 19, wherein an edge in the first video frame aligns more closely to a first corresponding edge in the augmented segmentation map than to a second corresponding edge in the segmentation map.

30. The method of claim 19, wherein outputting the processed variant of the video includes outputting the processed image data.

* * * * *